US012244929B1

(12) United States Patent
Risley et al.

(10) Patent No.: US 12,244,929 B1
(45) Date of Patent: Mar. 4, 2025

(54) DEVICE WITH MOVEABLE PORTION INCLUDING SENSORS

(71) Applicant: AMAZON TECHNOLOGIES, INC., Seattle, WA (US)

(72) Inventors: Michael Risley, San Francisco, CA (US); Michael L. Richards, San Francisco, CA (US); Dean Zachary Dijour, Morganville, NJ (US); Kyle Crouse, Valley Village, CA (US); Varsha Iyengar, San Francisco, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 111 days.

(21) Appl. No.: 17/936,827

(22) Filed: Sep. 29, 2022

(51) Int. Cl.
| | |
|---|---|
| *H04N 23/695* | (2023.01) |
| *G01L 5/22* | (2006.01) |
| *H04N 23/51* | (2023.01) |
| *H04N 23/667* | (2023.01) |
| *H04R 1/04* | (2006.01) |

(Continued)

(52) U.S. Cl.
CPC ........... *H04N 23/695* (2023.01); *H04N 23/51* (2023.01); *H04N 23/667* (2023.01); *H04R 1/04* (2013.01); *H04R 1/406* (2013.01); *H04R 3/005* (2013.01); *G01L 5/22* (2013.01)

(58) Field of Classification Search
CPC .... H04N 23/695; H04N 23/51; H04N 23/667; H04R 1/04; H04R 1/406; H04R 3/005; G01L 5/22
See application file for complete search history.

(56) References Cited

U.S. PATENT DOCUMENTS 11,140,249 B2 * 10/2021 Chen ................... H04M 1/0264
2007/0240347 A1 10/2007 Chang
(Continued)

FOREIGN PATENT DOCUMENTS

| JP | H0639610 A | 2/1994 |
| WO | 1999016065 A1 | 4/1999 |

OTHER PUBLICATIONS

Lee, Michael, "Non-final Office Action dated Mar. 4, 2024", U.S. Appl. No. 17/936,829, The United States Patent and Trademark Office, Mar. 4, 2024.

(Continued)

*Primary Examiner* — Ahmed A Berhan
(74) *Attorney, Agent, or Firm* — Lindauer Law, PLLC

(57) ABSTRACT

A sensor head transitions between a retracted and extended state. While retracted, sensors are covered. While extended, the sensors are exposed and may be used to acquire sensor data about the physical space. A force applied by a user, or a received command, may initiate transition. For example, a user may press on the sensor head to initiate retraction or extension. A motor provides a force to move the sensor head and generate haptic feedback, while a position encoder determines a displacement of the sensor head due to an external force being applied. Different applications of force by the user to the sensor head may result in different operations by the device. For example, a short push may retract the sensor head and disable the sensors for a specified time interval. In comparison a long push may retract the sensor head and disable the sensors until a specified clock time.

20 Claims, 11 Drawing Sheets

(51) Int. Cl.
*H04R 1/40* (2006.01)
*H04R 3/00* (2006.01)

(56) References Cited

U.S. PATENT DOCUMENTS

| | | | |
|---|---|---|---|
| 2008/0109834 A1 | 5/2008 | Mizuno | |
| 2013/0188010 A1* | 7/2013 | Dortch | H04N 23/698 |
| | | | 348/37 |
| 2014/0339012 A1* | 11/2014 | Richardson | A45F 5/00 |
| | | | 181/202 |
| 2015/0189175 A1* | 7/2015 | Fan | H04N 23/698 |
| | | | 348/37 |
| 2020/0248493 A1 | 8/2020 | Kamemoto et al. | |
| 2021/0070199 A1 | 3/2021 | Matha et al. | |
| 2021/0074138 A1* | 3/2021 | Micko | G08B 21/0492 |
| 2022/0174198 A1* | 6/2022 | Wang | G01D 5/145 |

OTHER PUBLICATIONS

Bezek, Scott, "SmartKnob", GitHub, Inc., Scott Bezek, 2022, 12 pages. Retrieved from the Internet: URL: https://github.com/scottbez1/smartknob#readme.

Sitnik, et al., "Easing Functions Cheat Sheet", 2 pages. Retrieved from the Internet: URL: https://easings.net/#easeOutCirc.

* cited by examiner

DEVICE WITH MOVEABLE PORTION INCLUDING SENSORS

BACKGROUND

A device may use sensors to perform various functions.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
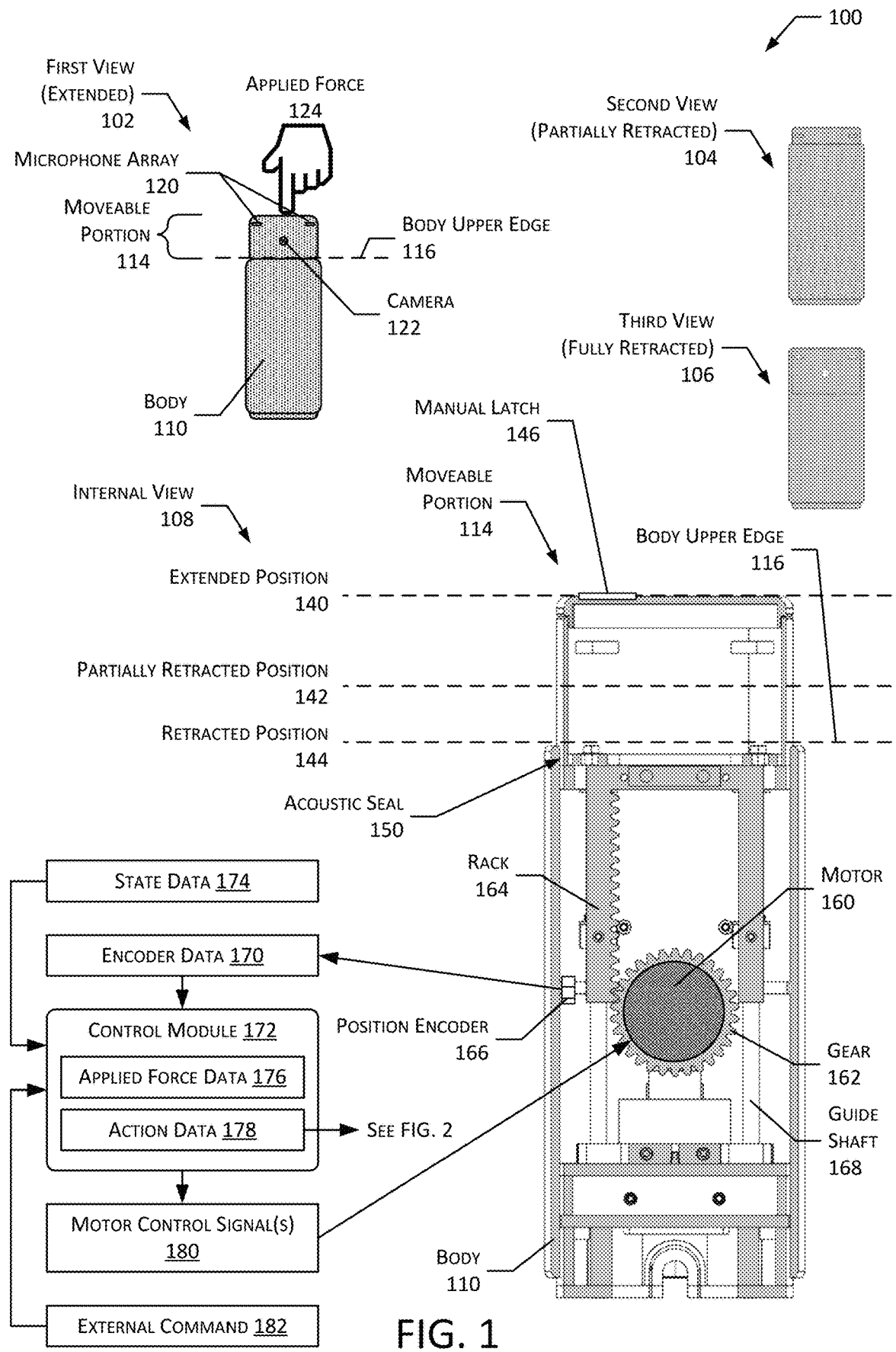
FIG. 1 illustrates a device with a moveable portion that extends to expose sensors and retracts to block sensors, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

Various devices may have sensors such as microphone arrays, cameras, and so forth. These devices may be stationary or mobile during use. For example, the device may rest on a surface such as a table or countertop. In another example, the device may comprise a robot that may move autonomously.

These devices may have different operational modes, responsive to various inputs such as user commands. For example, while in a "wake mode" the device may use one or more sensors to acquire sensor data about the surrounding environment. In another example, while in a "privacy mode" the device may disable the sensors to cease acquiring sensor data.

Described in this disclosure are devices and techniques to provide a user with assurance that the device is in a "privacy mode". The device includes a moveable portion and a body portion. One or more sensors, such as the microphone array, camera, and so forth are mounted to the moveable portion. While in a "wake mode" the moveable portion is extended, relative to the body portion, and the sensors are able to operate unimpeded by a structure of the body portion. In comparison, while in a "privacy mode" the moveable portion is retracted and operation of the sensors is impeded by the structure of the body portion.

The physical displacement of the moveable portion provides an immediate and clear visual indicator to users as to the state of the sensors. For example, a quick glance at the device allows a user to see if the moveable portion is extended or retracted. This provides a substantial improvement to the user's experience, as this may be easier to observe than traditional methods such as illuminating a small indicator light.

The physical displacement also provides an improved experience for users who are visually impaired. For example, a user may determine by touch whether the moveable portion is extended or retracted.

The physical displacement also provides a physical reassurance to the user with respect to their privacy. For example, while in the retracted position the microphone array is unable to acquire sounds from the surroundings effectively, the view of the camera is completely blocked, and so forth.

A control module controls a motor that uses a mechanical linkage to move the moveable portion relative to the body portion. A position encoder may provide encoder data indicating a position of the moveable portion, relative to the body portion. During operation, the motor may operate to maintain a particular setpoint position of the moveable portion, such as an extended position, a partially retracted position, a retracted position, and so forth. For example, the control module may maintain the moveable portion at a setpoint position as indicated by the position encoder, to maintain the moveable portion in the extended position.

Applied force data may be acquired that is indicative of an applied force to the moveable portion, such as resulting from a user pushing on the moveable portion. The applied force data may be determined using various techniques. In one implementation, the applied force data is determined based on encoder data from the position encoder associated with the moveable portion, based on information such as changes in electrical current drawn by the motor, and so forth.

The control module may accept as input state data, encoder data, applied force data, or other information to determine action data. The input state data is indicative of operation of at least a portion of the device. For example, the input state data may indicate that the camera is enabled at this time, the microphone array is enabled at this time, and so forth. The encoder data may indicate the position of the moveable portion at this time. The action data is indicative of one or more operations to be performed by at least a portion of the device. For example, the action data may specify transitioning to the "privacy mode" with the moveable portion being moved to the retracted position, the microphone array being disabled, and the camera being disabled. In some implementations, the action data may also specify a time limit or duration for the resulting mode. For example, responsive to an applied force, the device may transition to the "privacy mode" for a preset duration, such as one day, and then transition automatically to the "wake mode".

The control module may determine different action data based on one or more characteristics indicated by the applied force data. For example, an applied force having a duration between 500 milliseconds (ms) and 1000 ms may result in a first operating mode. In another example, an applied force having a duration of between 100 ms and 500 ms may result in a second operating mode.

ILLUSTRATIVE SYSTEM

FIG. 1 illustrates a device 100 with a moveable portion that extends to expose sensors and retracts to block sensors, according to some implementations. The device 100 may be stationary, as shown here, or may be able to autonomously move in a physical space. For example, the device 100 may be part of an autonomous mobile device such as a robot.

FIG. 1 shows a first view 102 of the device 100 in an extended condition. The device 100 may comprise a body 110 and a moveable portion 114. The moveable portion 114 is moveable, with respect to the body 110, between a retracted position and an extended position. One or more sensors are affixed to the moveable portion 114. For example, the moveable portion 114 may include a microphone array 120 comprising a plurality of microphones, a camera 122, and so forth.

While in an extended position 140, the one or more sensors are above a body upper edge 116 of the body 110. As a result, in the extended position 140 the one or more sensors are exposed to the surrounding environment. For example, the microphone array 120 may be used to acquire sound data that is then processed to determine commands spoken by a user. In another example, the camera 122 may be used to acquire image data that is used for a videoconference.

A user may provide an applied force 124 to the moveable portion 114. For example, a user may push down on a top of the moveable portion 114. As described below, responsive to the applied force 124, the device 100 may perform various actions, such as partially retracting the moveable portion 114, fully retracting the moveable portion 114, extending the moveable portion 114, changing the operating state of the one or more sensors, and so forth.

A second view 104 depicts the device 100 in a partially retracted position 142. In the partially retracted position 142 the microphone array 120 remains above the body upper edge 116 while the camera 122 is located below the body upper edge 116. In the partially retracted position 142, the microphone array 120 may be enabled and used, while the camera 122 is disabled as its field of view is blocked by the structure of the body 110.

A third view 106 depicts the device 100 in a fully retracted position 144. In the fully retracted position 144, the microphone array 120 and the camera 122 are both below the body upper edge 116. In the fully retracted position 144, the microphone array 120 is disabled and the camera 122 is disabled.

An internal view 108 depicts a cross sectional view of one implementation of the device 100. The moveable portion 114 is shown in an extended position 140. Also depicted are a partially retracted position 142 and a retracted position 144.

In some implementations the device 100 may include a manual latch 146. When engaged and in a first latch position, the manual latch 146 member inhibits movement of the moveable portion 114 from a retracted position 144. For example, the user may use the manual latch 146 to lock the moveable portion 114 in the retracted position 144. While the manual latch 146 is engaged in the first latch position, the moveable portion 114 is unable to be moved from the retracted position 144. While the manual latch 146 is in a second latch position, the manual latch 146 does not inhibit movement of the moveable portion 114. In other implementations the manual latch 146 may be used to maintain other positions. For example, a manual latch 146 may be used to lock the moveable portion 114 in the partially retracted position 142 or in the extended position 140.

An acoustic seal 150 provides a seal between the moveable portion 114 and the body 110 while the moveable portion 114 is in the retracted position 144. While in the retracted position 144 the acoustic seal 150 attenuates sounds from the surrounding environment before those sounds reach the microphone array 120.

The device 100 includes a motor 160 that moves a mechanical linkage to move the moveable portion 114. In this implementation, the motor 160 comprises a rotor that rotates an output shaft and a stator. The stator may comprise a plurality of stator windings that provide a plurality of magnetic poles. The motor 160 may include, or may be connected to, electronics that operate to provide an electrical current to one or more of the stator windings, thus energizing the stator windings. The energized stator windings may apply a force or torque to the rotor and thus the output shaft. In other implementations, other rotary motor 160 designs may be used, linear actuators may be used, and so forth.

In this implementation the mechanical linkage comprises a rack and pinion arrangement. The rack and pinion comprises a gear 162 affixed to the output shaft of the motor 160 and a rack 164. The gear 162 comprises a first plurality of teeth. The rack 164 comprises a second plurality of teeth. A portion of the first plurality of teeth of the gear 162 engage a portion of the second plurality of teeth of the rack 164. The motor 160 and the gear 162 may be affixed to the body 110, while the rack 164 is affixed to the moveable portion 114. During operation, the motor 160 may rotate, driving the gear 162 and displacing the rack 164. One or more guide shafts 168 maintain a relative alignment and constrain the movement of the moveable portion 114 relative to the body 110. The mechanical linkage may be capable of being back driven. For example, movement of the rack 164 may result in rotation of the gear 162 that in turn rotates a portion of the motor 160.

A position encoder 166 is associated with the moveable portion 114. During operation, the position encoder 166 determines encoder data 170. The encoder data 170 is indicative of a position of the moveable portion 114 with respect to the body 110. In one implementation the position encoder 166 may comprise an optoelectronic device such as an infrared emitter and detector. An optical tag such as a strip of preprinted markings may be affixed to the rack 164 and may be read by the optoelectronic device to determine the position of the rack 164, and thus the moveable portion 114. In other implementations other position encoders 166 may be used. For example, a rotary position encoder may be used in conjunction with the gear 162. In some implementations, a positional encoding scheme may be used, wherein particular displacements are associated with particular output, allowing an absolute determination of the position. In other implementations a relative encoding scheme may be used.

In other implementations other mechanical linkages may be used by the device 100. For example, the mechanical linkage may comprise one or more of a friction wheel, linear actuator, cam and pushrod, and so forth. The mechanical linkage may be capable of being back driven. For example, the mechanical linkage may have a first portion mechanically coupled to a second portion. Displacement of the first portion may move the second portion, while displacement of the second portion may move the first portion.

In some implementations the motor 160 may comprise a brushless direct current (DC) motor having at least six poles. During operation, the motor 160 may be driven to apply torque to maintain a particular angular position of a motor shaft. For example, the motor 160 may maintain a particular angular position by providing a counter torque responsive to an externally applied torque to the shaft. Continuing the example, an external torque in a first direction that displaces the shaft in a first direction may be countered with a counter torque generated by the motor 160 that attempts to displace the shaft in a second direction (opposite the first direction) and return the shaft to a particular angular position.

In some implementations the motor 160 may include or be used as the position encoder 166. For example, beginning at a specified reference position, the motor 160 may store information about a count of rotations and their respective directions. Based on this information and assuming no gear slippage, data indicative of a position of the moveable portion 114 may be determined. In another example, the motor 160 may include an absolute angular position encoder, and the mechanical linkage may be configured such that a given angular position corresponds to a particular position of the moveable portion 114.

A control module 172 comprises electronics to operate the motor 160. For example, the control module 172 may comprise a processor, microcontroller, motor driver, and so forth. The control module 172 may accept as input one or more of encoder data 170, state data 174, an external command 182, and so forth. The control module 172 generates as output one or more motor control signals 180 that may drive the motor 160 or operate motor control electronics of the motor 160.

During operation, the control module 172 may operate the motor 160 to maintain the moveable portion 114 at a specified setpoint position. For example, setpoint positions may be established for the extended position 140, the partially retracted position 142, the retracted position 144, and so forth. A position indicated by the encoder data 170 is compared to the setpoint position. Responsive to a difference between the encoder data 170 and the setpoint position, the control module 172 may generate motor control signals 180 to operate the motor 160 to move the moveable portion 114 to the setpoint position.

The control module 172 may generate motor control signals 180 to provide other operations of the motor 160. For example, the control module 172 may change a rotational speed of the rotor of the motor 160 as a function of time during rotation of the rotor.

The control module 172 may determine or accept as input the applied force data 176. In one implementation, the applied force data 176 is determined based on encoder data 170 from the position encoder 166 associated with the moveable portion 114. For example, given first encoder data 170(1) acquired at a first time and second encoder data 170(2) acquired at a second time, a displacement of the moveable portion 114 may be determined based on a difference between the data. The applied force data 176 may be determined based on this difference.

In another implementation, the applied force data 176 may be determined based on information associated with operation of the motor 160. For example, the control module 172 may acquire information indicative of an electrical current drawn by the motor 160 at different times. An increase in electrical current drawn may correspond to the operation of the control module 172 and motor 160 to attempt to maintain a particular setpoint position. For example, the applied force 124 is countered (at least in part) by the counter torque of the motor 160, resulting in an increase in the electrical current consumed by the motor 160 to generate the counter torque. In addition to the electrical current value described, other electrical values may also be used to determine the applied force data 176. In one implementation, the electrical values may comprise a voltage value. For example, a back electromotive force (EMF) may be used to determine the applied force data 176.

In other implementations combinations of these techniques, or other techniques, may be used to determine the applied force data 176. For example, the motor 160 may include circuitry to provide output indicative of shaft torque. The applied force data 176 may be determined based on the shaft torque.

The applied force data 176 may be indicative of one or more characteristics of the applied force 124. These characteristics may include, but are not limited to, a magnitude of the applied force 124, a duration of the applied force 124, a start time of the applied force 124, an end time of the applied force 124, a pattern of a plurality of applied forces 124 within a specified time interval, a rate of change per unit time of the applied force 124, and so forth.

In some implementations the applied force data 176 may be representative of a linear force expressed in Newtons, a torque expressed as Newton-meters, or another unit of force. The applied force data 176 may also be representative of or based on other characteristics. For example, current data, voltage data, position data, etc. may be characterized as, or used to generate the applied force data 176.

The control module 172 may determine state data 174 or may receive the state data 174 from another portion of the device 100, such as shown in FIG. 1. For example, a processor of the device 100 may send at least a portion of the state data 174 to the control module 172.

The state data 174 may be indicative of a state of operation of one or more portions of the device 100, such as one or more sensors. For example, the state data 174 may be indicative of a state of operation of the microphone array 120, the camera 122, and so forth at a particular time. Continuing the example, the state data 174 may indicate "{mic_array: enabled, camera: enabled}".

In some implementations the state data 174 may be indicative of particular operating modes of the device 100. For example, the state data 174 may indicate if the device 100 is operating in a "wake mode" in which it acquires sensor data, is operating in a "privacy mode" in which one or more sensors are disabled, and so forth.

The control module 172 may determine action data 178 responsive to one or more of the encoder data 170, the state data 174, an external command 182, and so forth. The action data 178 may specify that the control module 172 maintain the moveable portion 114 at a particular setpoint position, generate a haptic animation, and so forth. For example, a haptic animation may comprise a set of movements of the motor 160 that produce a haptic or tactile output that may be felt by a user who is applying the applied force 124. For example, a haptic animation may comprise a series of pulsed small movements, changes in torque applied to the motor 160, and so forth.

In some implementations the action data 178 may include one or more commands or instructions that are provided to another component of the device 100. For example, the action data 178 or a portion thereof may be sent to the processor 204.

Responsive to changes in the encoder data 170, the control module 172 may generate motor control signals 180 to operate the motor 160 to maintain the particular setpoint position, perform a haptic animation, and so forth. In some implementations, the control module 172 may operate responsive to an external command 182. For example, a processor of the device 100 may send a command to the control module 172 to provide a haptic animation and then move the moveable portion 114 to a retracted position 144.

The user may also control the device 100 by using an applied force 124 to the moveable portion 114. For example, while the moveable portion 114 is in the extended position 140, a user may push down on the moveable portion 114 to transition the device 100 to a privacy mode.

The control module 172 may use the applied force data 176 to determine action data 178. For example, responsive to detection of an applied force 124, the control module 172 may generate action data 178 that moves the moveable portion 114 to the retracted position 144. In some implementations, different characteristics of applied force 124 may be associated with different actions indicated by the action data 178. This is illustrated in Table 1 below.

In some implementations, the action data 178 may be based at least in part on the state data 174. For example, if the device 100 is operating in a wake mode and an applied force 124 is determined, the device 100 may immediately retract the moveable portion 114, transition to a privacy mode, and remain in the privacy mode for a specified period of time or until another command is received to transition to the wake mode. This is illustrated in Table 1 below.

TABLE 1

| Present State | Applied Force | Action | Haptic Animation |
|---|---|---|---|
| Wake mode, sensors enabled | Long push | Transition to privacy mode, retract and disable sensors | Long pulse and short pulse |
| Privacy mode, sensors disabled | Long push | Transition to wake mode, extend and enable sensors | Short pulse and long pulse |
| Wake mode, sensors enabled | Short push | Transition to visual privacy mode, partially retract and disable camera | Time varying sinusoidal amplitude variation |
| Wake mode, partially retracted, microphone array enabled, camera disabled | Short push | Extend and enable camera | Long pulse, short pulse, long pulse, short pulse |
| Wake mode, partially retracted, microphone array enabled, camera disabled | Long push ramping from low magnitude force to high magnitude force | Transition to privacy mode, retract and disable microphone array | Long pulse and short pulse |
| Any mode | Extended long push | Transition to privacy mode, retract and disable all sensors for 24 hours | Two short pulses and three long pulses |
| Any mode | Velocity produced by applied force exceeds threshold value | Transition to wake mode, extend and enable sensors, send an emergency alert message | Three short pulses. |

In some implementations, initiation of the action specified by the action data 178 may be configured to occur after the applied force 124 decreases below a threshold value. For example, once the applied force data 176 indicates that the applied force 124 has been discontinued, such as from the user removing their finger, the control module 172 may proceed to perform the action indicated by the action data 178, such as generating motor control signals 180 to operate the motor 160, operate other portions of the device 100, and so forth.

In some implementations, a sensor such as a switch may be used to determine if the manual latch 146 is engaged. In other implementations, determination of engagement of the manual latch 146 may be determined based on data associated with operation of the motor 160, encoder data 170, applied force data 176, and so forth. For example, if the encoder data 170 indicates the moveable portion 114 is in the retracted position 144, the electrical current drawn by the motor 160 exceeds a threshold value, and no change is observed in the encoder data 170 for a threshold time, the manual latch 146 may be deemed to be engaged. Responsive to this determination, the control module 172 may suspend operation to extend the moveable portion 114 until applied force data 176 has been determined.

Figure 2:
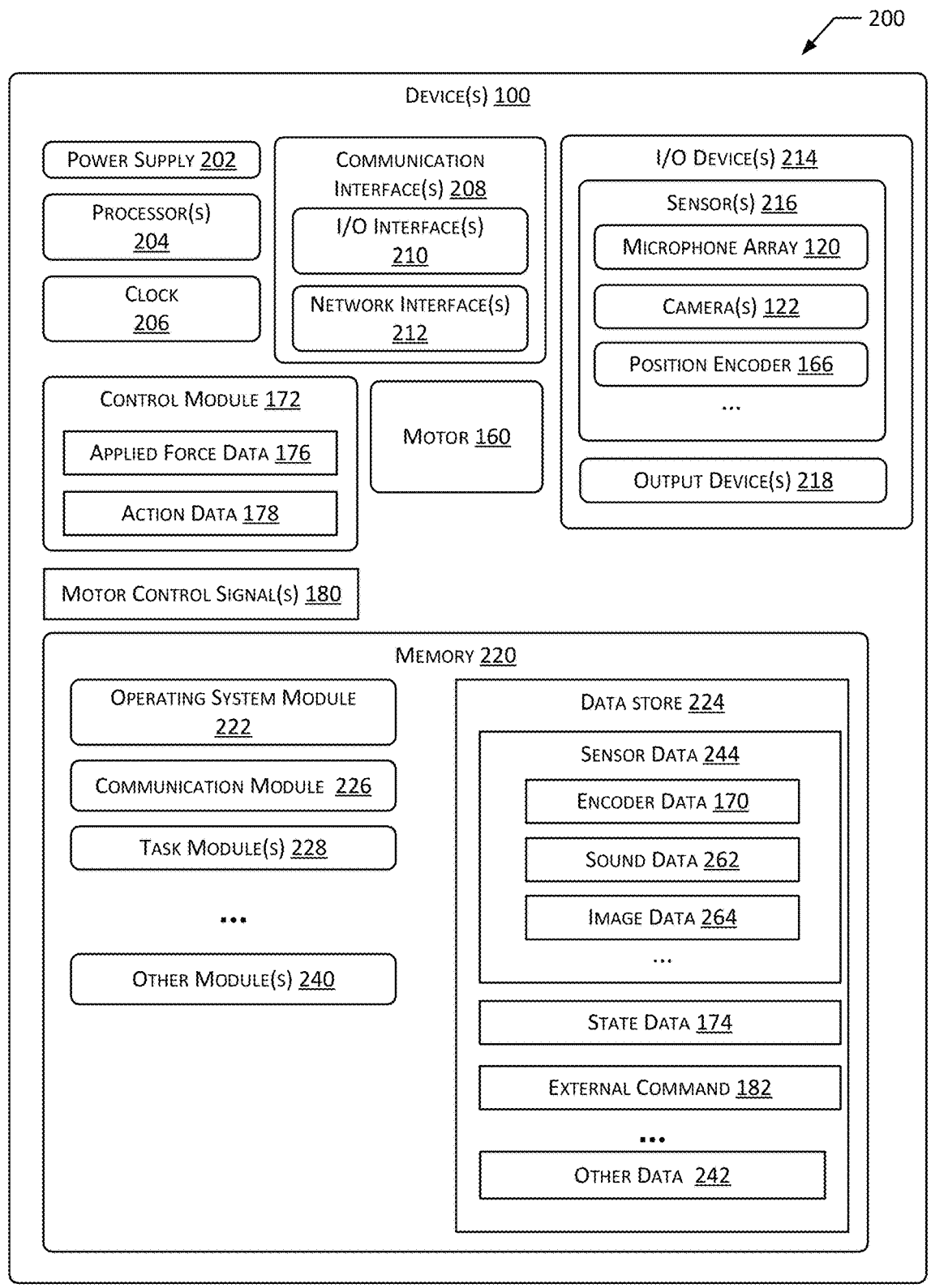
FIG. 2 is a block diagram of the device, according to some implementations.

FIG. 2 is a block diagram 200 of the device 100, according to some implementations.

The device 100 may include one or more power supplies 202 that may be configured to provide electrical power suitable for operating the components in the device 100. The one or more power supplies 202 may comprise batteries, capacitors, fuel cells, photovoltaic cells, wireless power receivers, conductive couplings suitable for attachment to a power source such as provided by an electric utility, and so forth. The device 100 may include one or more hardware processors 204 (processors) configured to execute one or more stored instructions.

The processors 204 may comprise one or more cores. The processor 204 may include microcontrollers, systems on a chip, field programmable gate arrays, digital signal processors, graphic processing units, general processing units, and so forth.

One or more clocks 206 may provide information indicative of date, time, ticks, and so forth. For example, the processor 204 may use data from the clock 206 to determine a time associated with particular sensor data 244.

The device 100 may include one or more communication interfaces 208 such as input/output (I/O) interfaces 210, network interfaces 212, and so forth. The communication interfaces 208 enable the device 100, or components thereof, to communicate with other devices or components. The communication interfaces 208 may include one or more I/O interfaces 210. The I/O interfaces 210 may comprise Inter-Integrated Circuit (I2C), Serial Peripheral Interface bus (SPI), Universal Serial Bus (USB) as promulgated by the USB Implementers Forum, RS-232, and so forth.

The network interfaces 212 may be configured to provide communications between the device 100 and other devices, such as routers, access points, and so forth. The network interfaces 212 may include devices configured to couple to personal area networks (PANs), local area networks (LANs), wireless local area networks (WLANS), wide area networks (WANs), and so forth. For example, the network interfaces 212 may include devices compatible with Ethernet, Wi-Fi, Bluetooth, and so forth.

The I/O interface(s) 210 may couple to one or more I/O devices 214. The I/O devices 214 may include one or more sensors 216, one or more output devices 218, and so forth.

The device 100 may include one or more sensors 216 to acquire sensor data 244. The sensors 216 may include one or more microphone array(s) 120, camera(s) 122, or position encoder(s) 166. The device 100 may include other sensors 216 that are not depicted, such as inertial measurement unit(s) (IMU), radar, sonar, depth cameras, lidar, radio receivers, ambient light sensors, force sensors, and so forth. For example, in some implementations a force sensor such as a pressure sensitive resistor, a strain gauge, and so forth may be used to determine the applied force data 176 indicative of the applied force 124. Continuing the example, a strain gauge may be affixed to a portion of the body 110 or the moveable portion 114 and detect deformation of the portion responsive to application of the applied force 124.

The device 100 may include one or more microphone arrays 120. The microphone array 120 may comprise a plurality of microphones. The microphone array 120 may be located on, integrated with, supported by, or otherwise associated with the moveable portion 114. The microphone array 120 may acquire sound data 262.

During operation, the one or more cameras 122 may acquire images of a scene and produce image data 264. The one or more cameras 122 may be located on, integrated with, supported by, or otherwise associated with the moveable portion 114. The image data 264 may comprise still images, video, or other information indicative of the data acquired by the camera 122. The one or more cameras 122 may acquire image data 264 using one or more of infrared light, visible light, ultraviolet light, and so forth. For example, the camera 122 may comprise a red-green-blue (RGB) camera to acquire visible light images. In some implementations, the camera(s) 122 may comprise a charge coupled device (CCD), complementary metal oxide semiconductor (CMOS) device, microbolometer, and so forth. In some implementations the camera 122 may comprise a depth camera. The depth camera provides additional information indicative of a distance to an object in the camera field of view (FOV). For example, the depth camera may use a coded aperture, time of flight, structured light, or other techniques to determine data indicative of distance(s) to object(s) in the environment. In some implementations the one or more cameras 122 may be affixed to one or more of a pan or tilt mechanism. For example, a camera 122 may be affixed to a pan and tilt mechanism that allows an optical center of the camera 122 to be moved horizontally and vertically.

In some implementations, the device 100 or systems in communication with the device 100 may use at least a portion of the image data 264 acquired by the camera 122 for object recognition, user communication, and so forth. For example, the camera 122 may be used for videoconferencing or for acquiring pictures for the user.

The position encoder(s) 166 may provide encoder data 170 indicative of a position of at least a portion of one or more of the motor 160, an actuator, the moveable portion 114, and so forth. For example, the position encoder 166 may provide encoder data 170 indicative of a relative position of the moveable portion 114 with respect to the body 110. The position encoder 166 may be integral with the motor 160 or other actuator, or may be an external device added or used in conjunction with the motor 160 or other actuator. In one implementation, an integral position encoder 166 may utilize Hall effect sensors, magnets, and other components within the motor 160 to determine rotation of a shaft. For example, the motor 160 may comprise a brushless direct current (BLDC) motor or associated electronics that inform as to rotational speed, rotational count, rotational direction, and so forth. In another implementation, an optical encoder using a photodiode and light to detect a code printed on an encoder wheel, encoder markings on the rack 164 or other portion of the device 100, and so forth may be used. In another implementation, a combination of techniques may be used. For example, an optical encoder may be used to determine a reference point, such as a zero value. Subsequently, data from a motor encoder integrated motor 160 may be used to determine a position relative to the reference point.

The I/O devices 214 may also include output devices 218 such as one or more of a display device, audio speakers, and so forth. In some embodiments, the I/O devices 214 may be physically incorporated with the device 100 or may be externally placed. In some implementations, the moveable portion 114 may be used as an output device 218.

The device 100 may also include one or more buses or other internal communications hardware or software that allow for the transfer of data between the various modules and components of the device 100.

The device 100 includes the motor 160. In other implementations, other actuators may be used, or included. The actuators may comprise one or more of a motor, solenoid, piezoelectric material, electroactive polymer, shape-memory alloy, and so forth. The actuators produce movement in one or more of the device 100 relative to an external environment, relative motion between parts of the device 100, and so forth.

The device 100 includes the control module 172 that operates the motor 160 as described above. In some implementations at least a portion of the control module 172 may be stored in the memory 220. The control module 172 may send and receive data with other components of the device 100. For example, the control module 172 may send one or more of the encoder data 170, the applied force data 176, the action data 178, and so forth to the processor 204. In another example, the control module 172 may receive or retrieve the state data 174, the external command 182, and so forth.

As shown in FIG. 2, the device 100 includes one or more memories 220. The memory 220 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 220 provides storage of computer-readable instructions, data structures, program modules, and other data for the operation of the device 100. A few example functional modules are shown stored in the memory 220, although the same functionality may alternatively be implemented in hardware, firmware, or as a system on a chip (SoC).

The memory 220 may include at least one operating system (OS) module 222. The OS module 222 is configured to manage hardware resource devices such as the I/O interfaces 210, the I/O devices 214, the communication interfaces 208, and provide various services to applications or modules executing on the processors 204. The OS module 222 may implement a variant of the FreeBSD operating system as promulgated by the FreeBSD Project; other UNIX or UNIX-like variants; a variation of the Linux operating system; the Windows operating system from Microsoft Corporation of Redmond, Washington, USA; and so forth.

A communication module 226 may be configured to establish communications with the device 100, servers, other devices 100, and so forth. The communications may be authenticated, encrypted, and so forth. In some implementations, the external command 182 may be received using one of the communication interfaces 208.

One or more task modules 228 may perform various functions. For example, a task module 228 may provide a telephony or videoconferencing function. In another example, a task module 228 may operate in a sentry mode to attempt to detect authorized people.

The memory 220 may store a data store 224. The data store 224 may use a flat file, database, linked list, tree, executable code, script, or other data structure to store information. In some implementations, the data store 224 or a portion of the data store 224 may be distributed across one or more other devices including other devices 100, network attached storage devices, and so forth.

The data store 224 may store one or more of the sensor data 244, state data 174, the external command 182, and so forth. For example, the sensor data 244 may comprise the encoder data 170, the sound data 262, the image data 264, and so forth.

The data store 224 may also store other data, such as the state data 174, external command 182, and so forth. In one implementation, one or more of the OS module 222 or the task modules 228 may determine the state data 174.

Other modules 240 may also be present in the memory 220 as well as other data 242 in the data store 224.

Figure 3:
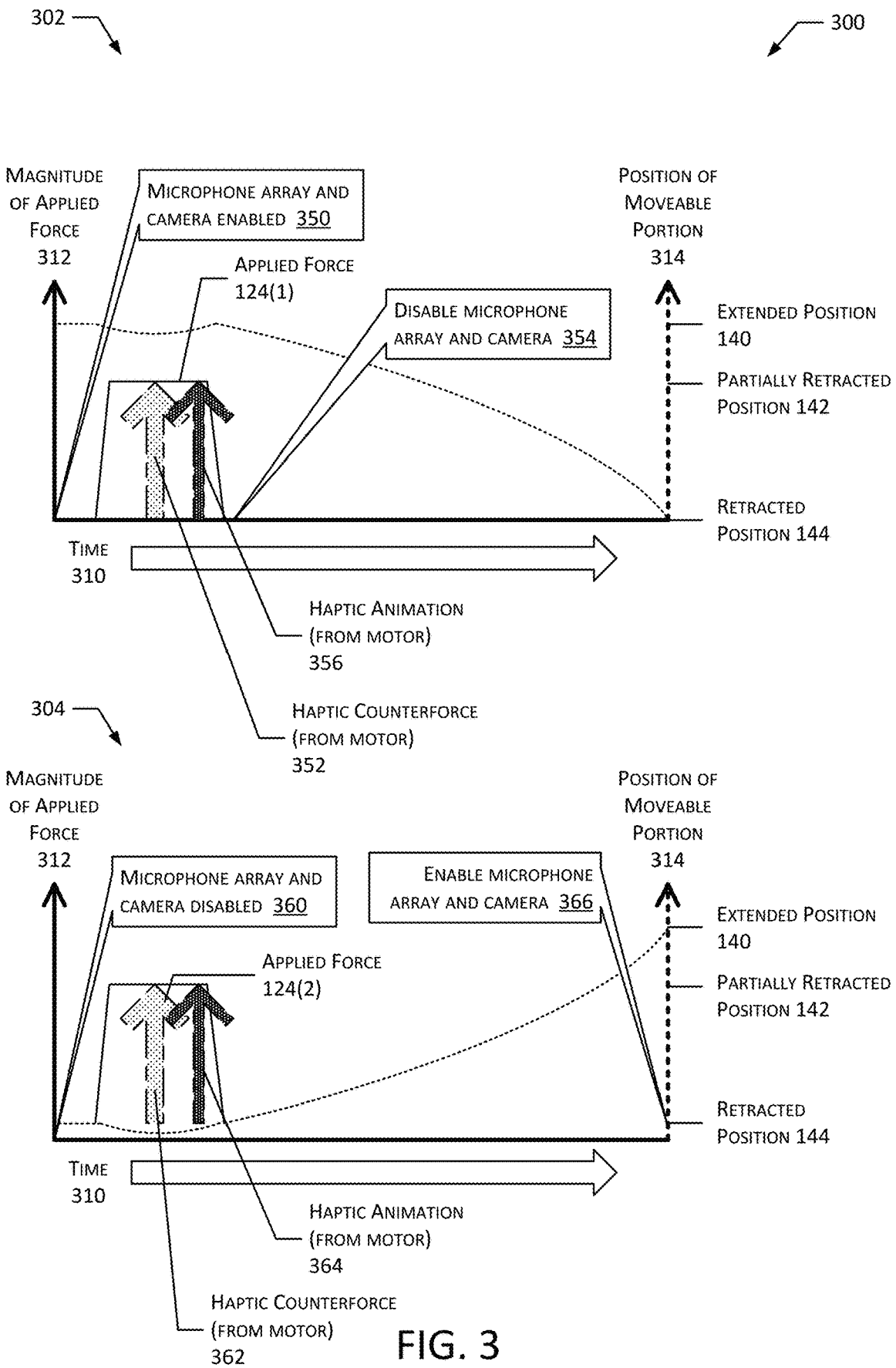
FIGS. 3-5 depict graphs of applied force over time, haptic counterforce from a motor, position of the moveable portion, and operational state of one or more sensors, according to some implementations.
Figure 4:
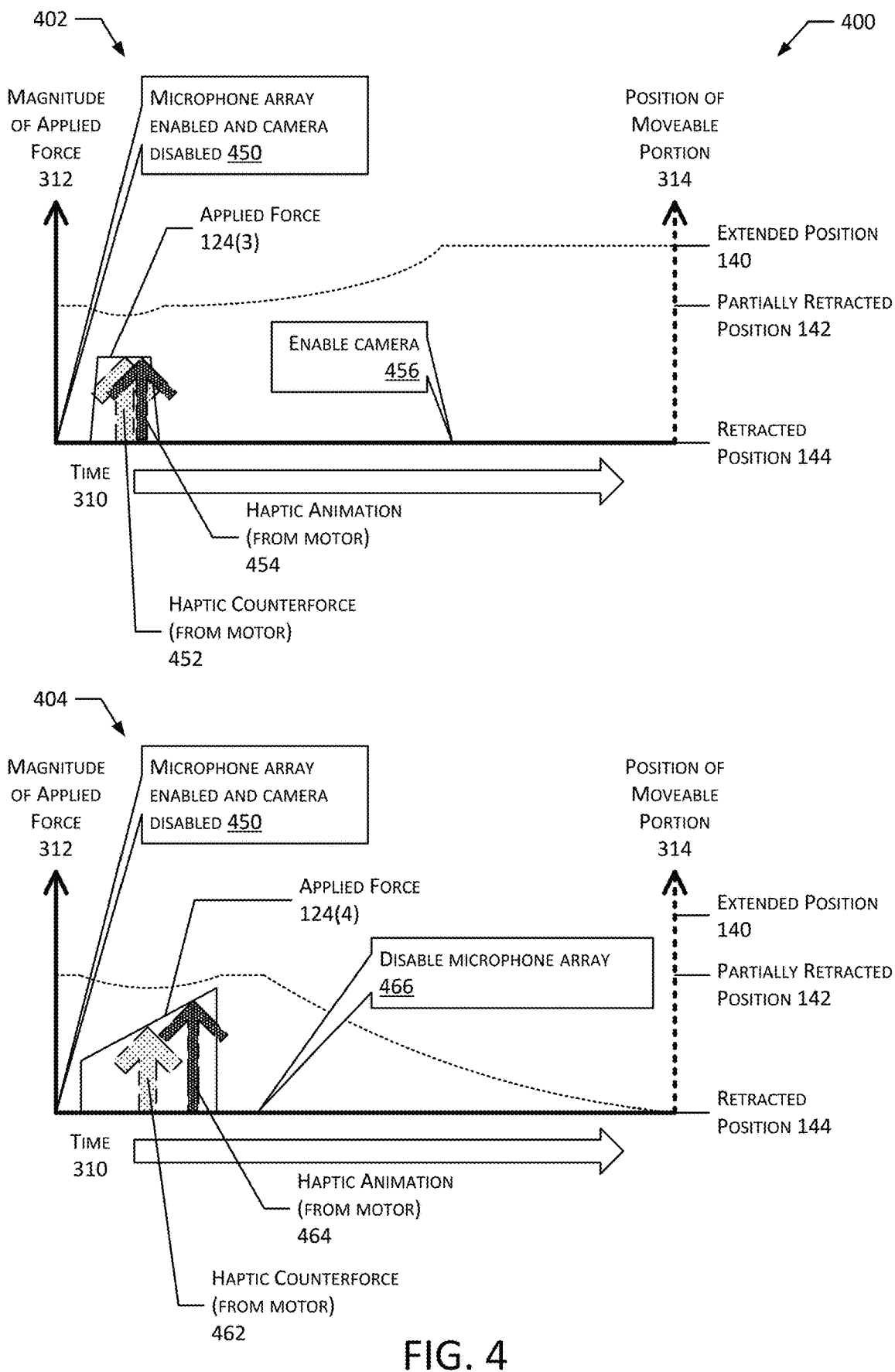
Figure 5:
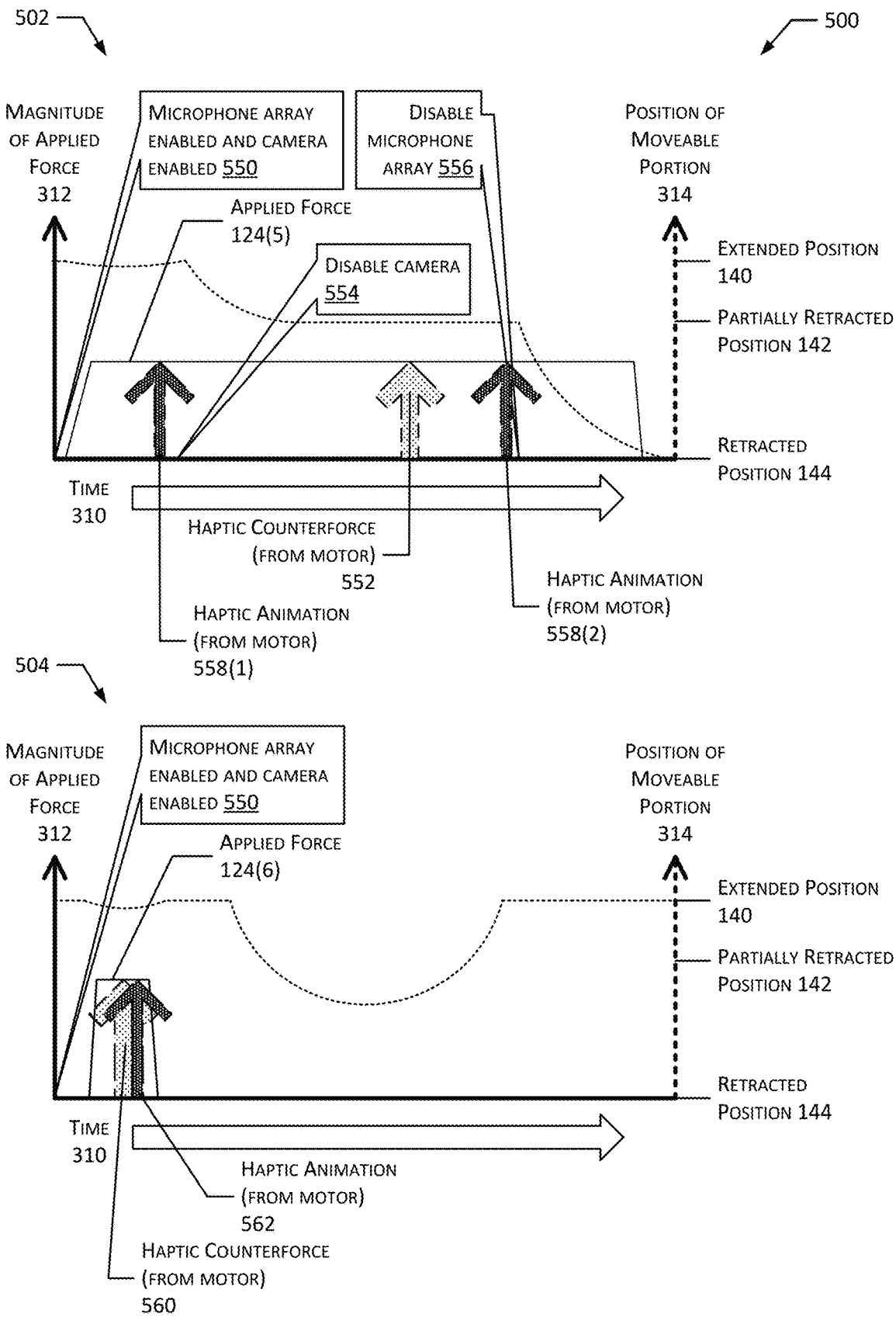

FIGS. 3-5 depict at 300, 400, and 500 graphs of applied force over time, haptic counterforce from a motor, position of the moveable portion, and operational state of one or more sensors, according to some implementations.

In these graphs, time 310 is indicated along a horizontal axis, with time increasing left to right. Solid graph lines indicate magnitude of an applied force 312. Dotted graph lines indicate a position of the moveable portion 314. Also indicated are reference lines indicative of the extended position 140, the partially retracted position 142, and the retracted position 144. Additional callouts specify information, such as an operating state associated with one or more components of the device 100.

Graph 302 depicts the device 100 beginning at a first time in an extended position 140, with the microphone array 120 and camera 122 in an enabled state 350.

At a second time, an applied force 124(1) having a first duration is applied to the moveable portion 114. Responsive to the applied force 124(1), the control module 172 may operate the motor 160 to attempt to maintain the moveable portion 114 in the extended position 140. As a result, the motor 160 is operated to provide a counter torque, resulting in a haptic counterforce 352. A haptic animation 356 may also be presented. For example, the motor 160 may be driven to present the haptic animation 356 while also attempting to maintain a specified setpoint position. From the point of view of the user who is pushing on the moveable portion 114, they would feel some resistance to their push. If a haptic animation 356 is presented, the user may also feel the haptic animation 356 being presented. In some implementations the haptic animation 356 may be presented at any time, or may be limited to presentation while the applied force 124 is in progress, or may be limited to beginning while the applied force 124 is in progress while continuing after the applied force 124 ceases. The haptic animation 356 presented may be specified by the action data 178 determined below.

The control module 172 determines the applied force data 176 indicative of the applied force 124(1). The applied force data 176 may be indicative of one or more characteristics of the applied force 124(1). For example, the applied force data 176 may be indicative of the duration of the applied force 124(1), the magnitude of the applied force 124(1), and so forth. In other implementations, the applied force data 176 may be provided to the control module 172.

In some implementations, an applied force 124 may be deemed to be an input based on the comparison of one or more characteristics of the applied force 124(1) to one or more thresholds. For example, if a duration of an applied force 124 exceeds a threshold duration, it may be deemed to represent user input. In another example, if a magnitude of an applied force 124 exceeds a threshold magnitude, it may be deemed to represent user input. In other examples, various thresholds may be combined. For example, a user input may be deemed to occur if the duration exceeds the threshold duration and the magnitude exceeds the threshold magnitude.

The control module 172 may determine action data 178 that is used to determine motor control signals 180 that operate the motor 160. The action data 178 may be determined based on one or more of the state data 174, the applied force data 176(1), and so forth. The action data 178 may include one or more haptic animations 356. The haptic animation 356 may provide the user with feedback to indicate that the input was detected, the action to be performed, or both.

Responsive to the applied force 124(1), the control module 172 begins to move the moveable portion 114 to the retracted position 144. The movement may include performance of one or more haptic animations 356. At a third time, such as after the movement begins, the microphone array 120 and the camera 122 are transitioned to a disabled state 354.

Graph 304 depicts the device 100 beginning in the retracted position 144. At a first time in this graph 304 the microphone array 120 and the camera 122 are in a disabled state 360. At a second time an applied force 124(2) is determined and deemed representative of user input. A haptic counterforce 362 is provided, responsive to the applied force 124(2). The applied force 124(2), such as applied by a user pressing down on the moveable portion 114 while in the retracted position 144, may apply a torque, via the mechanical linkage, to the motor 160. The applied force 124(2) may result in displacement of the moveable portion 114 as shown here.

Responsive to the applied force 124(2), the control module 172 determines action data 178 that produces motor control signals 180 to operate the motor 160 to move the moveable portion 114 from the retracted position 144 to the extended position 140 and perform a haptic animation 364. At a third time, such as after the movement is complete, the microphone array 120 and the camera 122 are transitioned to an enabled state 366. In this example, the applied force 124(2) has the same duration and magnitude as the applied force 124(1). However, responsive to the difference in initial state, the action data 178 by the control module 172 and the subsequent operation of the motor 160 differ between graph 302 and 304.

In some implementations one or more characteristics of the movement of the moveable portion 114 may be determined based on the applied force data 176 or other information. For example, a velocity of the applied force 124 may be determined and the motor 160 may be operated to move the moveable portion 114 at that same velocity. Continuing the example, if the applied force 124(1) displaces the moveable portion 114 with a velocity of 5 millimeters per second (mm/s), the moveable portion 114 may be retracted at 5 mm/s.

Graph 402 depicts the device 100 beginning in the partially retracted position 142. At a first time in this graph 402 the microphone array 120 is enabled and the camera 122 is disabled 450. At a second time an applied force 124(3) is determined and deemed representative of user input. A haptic counterforce 452 is provided, responsive to the applied force 124(3).

Responsive to the applied force 124(3), the control module 172 determines action data 178 to generate motor control signals 180 that operate the motor 160 to move the moveable portion 114 from the partially retracted position 142 to the extended position 140. The movement may include performance of one or more haptic animations 454. At a third time, such as after the movement is complete, the microphone array 120 remains enabled and the camera 122 is transitioned to an enabled state 456.

Graph 404 depicts the device 100 beginning in the partially retracted position 142. At a first time in this graph 404 the microphone array 120 is enabled and the camera 122 is disabled 450. At a second time an applied force 124(4) is determined and deemed representative of user input. In this graph 404, the determined characteristics of the applied force 124(4) as represented in the applied force data 176 indicate that the applied force 124(4) begins at a second time, ramped up or increased in magnitude until a maximum was reached at a third time, and then ceased. Also indicated was an overall duration of the applied force 124(4) that was greater than a long duration threshold.

A haptic counterforce 462 is provided, responsive to the applied force 124(4). The applied force 124(4) increases over time, so too does the haptic counterforce 462. As described above, the haptic animation 464 may be presented during application of the haptic counterforce 462.

Responsive to the determination that the applied force 124(4) manifests a ramp in magnitude and a duration exceeding the long duration threshold, the user input is deemed to be indicative of user input to transition to a privacy mode.

Responsive to the applied force 124(4), the control module 172 determines action data 178 that generates motor control signals 180 to operate the motor 160 to move the moveable portion 114 from the partially retracted position 142 to the retracted position 144. The movement may include performance of one or more haptic animations 464. At a fourth time, such as after the movement begins, the microphone array 120 is disabled and the camera 122 remains disabled.

Different combinations of duration, changes in magnitude, and other characteristics of the applied force 124 may be used to determine action data 178. As shown in 402 and 404, given the same starting state but differences in the applied forces 124, the device 100 may be commanded to perform different actions.

Graph 502 depicts the device 100 beginning in the extended position 140. At a first time in this graph 502 the microphone array 120 is enabled and the camera 122 is enabled 550. In this graph 502, the determined characteristics of the applied force 124(5) as represented in the applied force data 176 indicate that the applied force 124(5) begins at a second time and ceases at a third time. The overall duration of the applied force 124(5) is extremely long, greater than a long duration threshold.

A haptic counterforce 552 is provided, responsive to the applied force 124(5).

Responsive to the applied force 124(5), the control module 172 determines action data 178 that generates motor control signals 180 to operate the motor 160 to move the moveable portion 114 from the extended position 140 to the partially retracted position 142 and the camera is disabled 554. The movement may include performance of one or more haptic animations 558(1). Responsive to the ongoing applied force 124(5), the control module 172 then operates the motor 160 to resume moving the moveable portion 114 from the partially retracted position 142 to the retracted position 144. The movement may include performance of one or more haptic animations 558(2). At a fourth time, such as after the movement begins, the microphone array 120 is disabled 556 and the camera 122 remains disabled. In some implementations, responsive to the applied force 124 and movement of the moveable portion 114, use of the sensors 216 associated with the moveable portion 114 may be inhibited for a threshold period of time, until further user input such as another applied force 124, and so forth. For example, responsive to the extremely long duration applied force 124(5), the moveable portion 114 may remain in the retracted position 144 for 24 hours, until another applied force 124(7) (not shown) is applied, and so forth.

Graph 504 depicts the device 100 beginning in the extended position 140. At a first time in this graph 504 the microphone array 120 is enabled and the camera 122 is enabled 550. In this graph 504, an applied force 124(6) is represented that begins at a second time and ceases at a third time. A haptic counterforce 560 is provided, responsive to the applied force 124(6).

With regard to this graph, the control module 172 has been configured to acknowledge receipt of the applied force 124(6) while maintaining the current state of operation. Responsive to the applied force 124(6), the control module 172 determines action data 178 that generates motor control signals 180 to operate the motor 160 to move the moveable portion 114 from the extended position 140 to the partially retracted position 142 and then back to the extended position 140. This movement down and then back provides a clear indication to the user that the sensors 216 associated with the moveable portion 114 remain available for use in acquiring sensor data 244. This behavior may be utilized in situations such as in a sentry mode in which it would not be desirable for an intruder to be able to deactivate the sensors 216. The movement may also include performance of one or more haptic animations 562.

Figure 6:
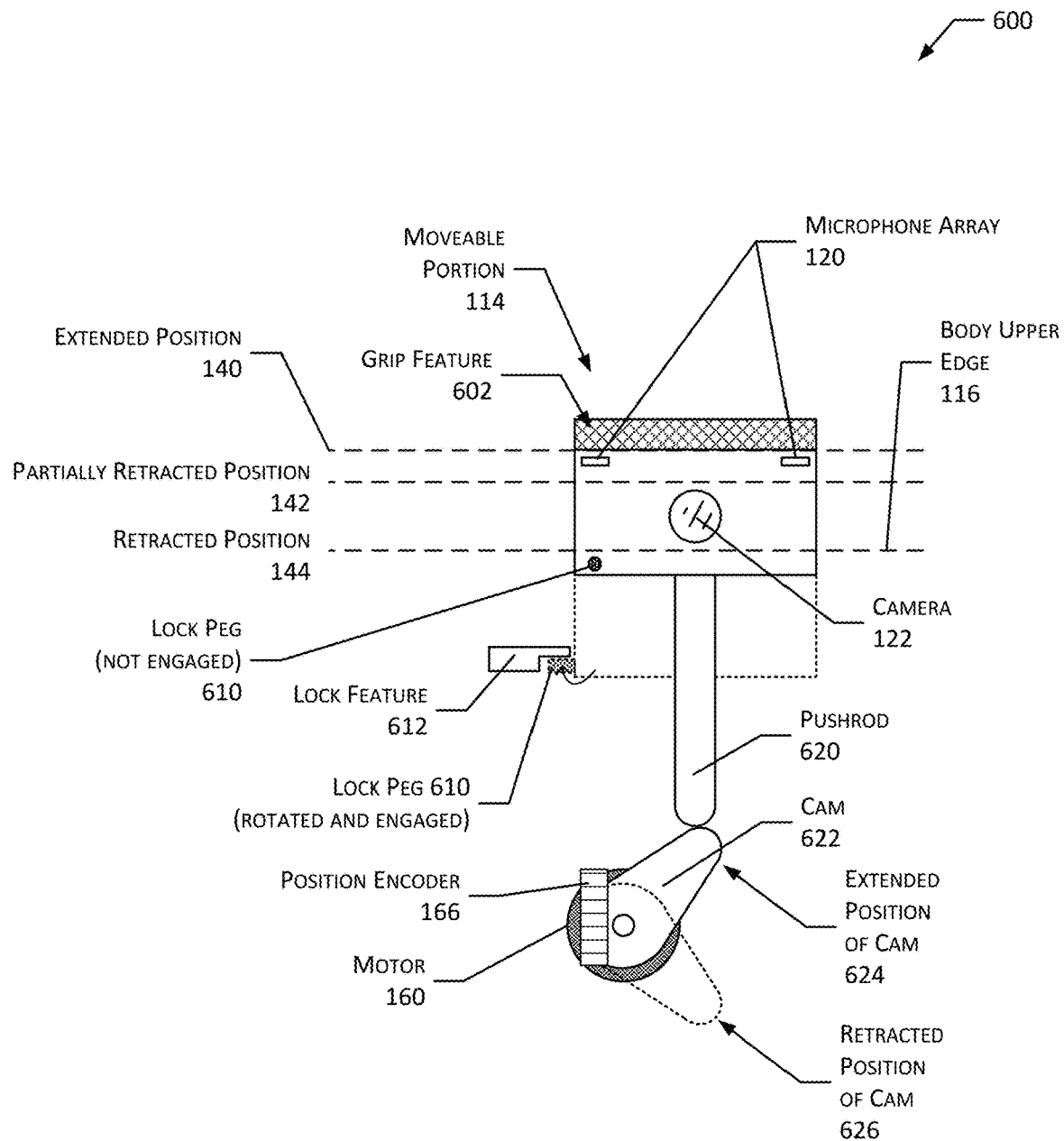
FIG. 6 depicts another implementation of some components of the device, according to some implementations.

FIG. 6 depicts at 600 another implementation of some components of the device 100. In this implementation, the mechanical linkage used to move the moveable portion 114 comprises a pushrod 620 and a cam 622. A distal end of the pushrod 620 is in contact with the moveable portion 114. A proximal end of the pushrod 620 is in contact with a portion of the cam 622. The cam 622 is mechanically coupled to the motor 160, such that rotation of a motor shaft moves the cam 622 between an extended position of the cam 624 and a retracted position of the cam 626. The device shown at 600 may include a position encoder 166. In the implementation shown, the position encoder 166 may determine an angular position of the cam 622.

A grip feature 602 is depicted. A user may grasp the grip feature 602 and rotate the moveable portion 114 relative to the body 110. The moveable portion 114 may include a lock peg 610. The body 110 may include a lock feature 612. While in the retracted position 144, the user may use the grip feature 602 to rotate the moveable portion 114 and engage or disengage the lock peg 610 with respect to the lock feature 612. While engaged, the lock peg 610 prevents the moveable portion 114 from moving from the retracted position 144. While disengaged, the lock peg 610 does not inhibit movement between the extended position 140 and the retracted position 144. In some implementations additional lock features 612 may be present, to allow for locking at particular positions. For example, a second lock feature 612(2) (not shown) may be used to lock the moveable portion 114 in the partially retracted position 142, or inhibit movement from the partially retracted position 142 to the extended position 140.

Figure 7:
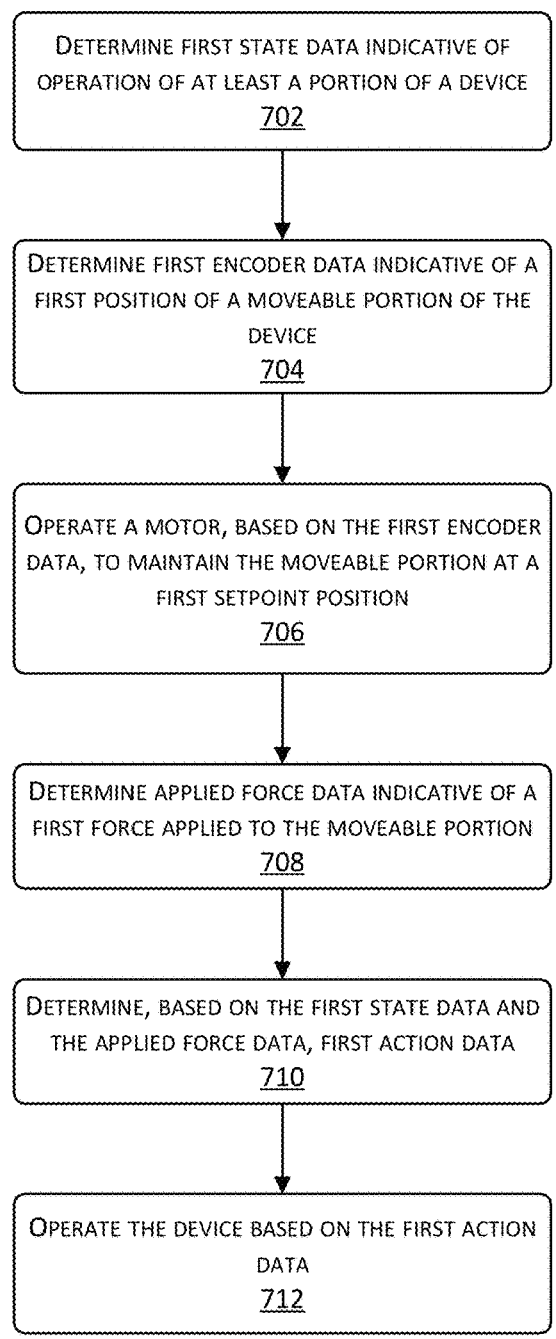
FIG. 7 is a flow diagram of a process for operating a device with a moveable portion, according to some implementations.

FIG. 7 is a flow diagram 700 of a process for operating a device 100 with a moveable portion 114, according to some implementations. The process may be implemented by one or more of the control module 172, the one or more processors 204, the motor 160, and so forth.

At 702 first state data 174(1) is determined. The state data 174 may be indicative of one or more of a state of operation of one or more sensors 216, other components of the device 100, or other devices in communication with the device 100. For example, the state data 174 may indicate a first state of operation of the camera 122, and a first state of operation of the microphone array 120.

At 704 first encoder data 170(1) is determined. The first encoder data 170(1) may be determined by the position encoder 166. The first encoder data 170(1) is indicative of a first position of the moveable portion 114 relative to the body 110 of the device 100.

At 706 the motor 160 is operated, based on the first encoder data 170(1), to maintain the moveable portion 114 at a first setpoint position. For example, the control module 172 may generate motor control signals 180 that operate the motor 160 to maintain the moveable portion 114 in the extended position 140.

At 708 applied force data 176 is determined. The applied force data 176 is indicative of a first applied force 124 applied to the moveable portion 114. For example, the applied force data 176 may be determined based on one or more of the encoder data 170, information associated with operation of the motor 160 such as electrical current consumption by the motor 160, and so forth.

At 710, based on the first state data 174(1) and the applied force data 176, first action data 178(1) is determined. For example, the first state data 174(1) and data indicative of a particular user input based on the applied force data 176 may be used to retrieve from a lookup table the first action data 178(1).

The first action data 178(1) may be indicative of one or more of a change in state of one or more components of the device 100, a particular setpoint position, and so forth. For example, the first action data 178(1) may be indicative of: a second setpoint position, a second state of operation of the camera 122, and a second state of operation of the microphone array 120.

At 712 the device 100 is operated based on the first action data 178(1). Continuing the example, the control module 172 may generate motor control signals 180 to operate the motor 160 to move the moveable portion 114 to the second setpoint position and maintain it there. Further continuing the example, the camera 122 may be transitioned to the second state of operation and the microphone array 120 may be transition to the second state of operation.

In some implementations, operation responsive to the first action data 178(1) may be performed after the applied force 124 decreases below a threshold value. For example, once the applied force data 176 indicates that the applied force 124 has ceased, the control module 172 may proceed to perform the action indicated by the first action data 178(1).

ADDITIONAL DISCUSSION

In accordance with one or more preferred implementations, the device 100 determines, based on sensor data 244 from one or more Hall effect sensors which indicate a rotational position of a rotor of the motor 160, a first encoded position for the shaft of the motor 160. The device 100 determines that the first encoded position for the motor 160 deviates from a first setpoint position, and applies torque to the rotor in a first direction to try to return the motor 160 to the first setpoint position.

As the user continues to press down on the moveable portion 114, the moveable portion 114 may be depressed further and accordingly the rotor may rotate further in the second direction.

The device 100 determines, based on sensor data 244 from the one or more Hall effect sensors which indicate a rotational position of the rotor, a second encoded position for the motor 160. The device 100 determines that the second encoded position for the motor 160 deviates from the first setpoint position by more than a first configured threshold, and sets a first state flag indicating that a transition to a second setpoint position should occur as soon as the user ceases pressing down on the moveable portion 114.

After the user ceases pressing down on the moveable portion 114, the device 100 determines, based on sensor data from the one or more Hall effect sensors which indicate a rotational position of the rotor, a third encoded position for the motor 160. The device 100 determines that a current encoded position for the motor 160 deviates from the first setpoint position by less than a previous encoded position. Based on this, and based on the first state flag being set, the device 100 applies torque to the rotor in the first direction to transition the motor 160 to the second setpoint position.

As torque is applied, the moveable portion 114 begins popping up, transitioning to an extended position 140. The device 100 determines, based on sensor data from the one or more Hall effect sensors which indicate a rotational position of the rotor, a fourth encoded position for the motor 160. The device 100 determines that the fourth encoded position for the motor 160 corresponds to the second setpoint position, and thus ceases applying torque to the rotor (or reduces the torque applied, e.g. in some implementations torque may need to be applied to counteract the effect of gravity, while in some implementations a latch, mechanical latch, or other mechanism may be used to secure a rotor, gear, moveable portion 114, or other component when rotation and movement is not desired).

Subsequently, when a user presses down on a moveable portion 114 of a device 100 that is in the extended position 140, this causes torque to be applied in the second direction to a rotor of a motor 160 connected to the moveable portion 114. This may cause movement of the moveable portion 114, and rotation of the rotor in the second direction.

In accordance with one or more preferred implementations, the device 100 determines, based on sensor data 244 from one or more Hall effect sensors which indicate a rotational position of the rotor, a fifth encoded position for the motor 160. The device 100 determines that the fifth encoded position for the motor 160 deviates from the second setpoint position, and applies torque to the rotor in the first direction to try to return the motor 160 to the second setpoint position.

As the user continues to press down on the moveable portion 114, the moveable portion 114 may be depressed further and accordingly the rotor may rotate further.

The device 100 determines, based on sensor data 244 from the one or more Hall effect sensors which indicate a rotational position of the rotor, a sixth encoded position for the motor 160. The device 100 determines that the sixth encoded position for the motor 160 deviates from the second setpoint position by more than a second configured threshold (which may be the same or different than the first configured threshold), and sets a second state flag (which may be the same as the first state flag, or different) indicating that a transition to the first setpoint position should occur as soon as the user ceases pressing down on the moveable portion 114.

After the user ceases pressing down on the moveable portion 114, the device 100 determines, based on sensor data 244 from the one or more Hall effect sensors which indicate a rotational position of the rotor, a seventh encoded position for the motor 160. The device 100 determines that a current encoded position for the motor 160 deviates from the second setpoint position by less than a previous encoded position. Based on this, and based on the second state flag being set, the device 100 applies torque to the rotor in the second direction to transition the motor 160 to the first setpoint position.

As torque is applied, the moveable portion 114 begins moving down, transitioning to the retracted position 144. The device 100 determines, based on sensor data 244 from the one or more Hall effect sensors which indicate a rotational position of the rotor, an eighth encoded position for the motor 160. The device 100 determines that the eighth encoded position for the motor 160 corresponds to the first setpoint position, and thus ceases applying torque to the rotor (or reduces the torque applied, e.g. in some implementations torque may need to be applied to counteract the effect of gravity, while in some implementations a latch, mechanical latch, or other mechanism may be used to secure a rotor, gear, moveable portion 114, or other component when rotation and movement is not desired).

A similar example will now be outlined for a device 100 configured to utilize a voltage or current measurement to determine a user's press that provides the applied force 124.

In accordance with one or more preferred implementations, when a user presses down on a moveable portion 114 of a device 100 that is in a retracted position 144, this causes torque to be applied in a second direction to a rotor of a motor 160 connected to the moveable portion 114. The motor 160 attempts to maintain the rotor in a rotational position corresponding to the setpoint which may result in an increase in voltage or current which can be measured.

In accordance with one or more preferred implementations, the device 100 determines that a measured voltage or current exceeds a first configured threshold, and sets a first state flag indicating that a transition to a second setpoint position should occur as soon as the user ceases pressing down on the moveable portion 114.

After the user ceases pressing down on the moveable portion 114, the device 100 determines, based on sensor data 244 from the one or more Hall effect sensors, that a current encoded position for the motor 160 deviates from the first setpoint position by less than a previous encoded position, or determines that a measured current voltage or current is less than a measured previous voltage or current. Based on one or both of these determinations, and based on the first state flag being set, the device 100 applies torque to the rotor in the first direction to transition the motor 160 to the second setpoint position.

As torque is applied, the moveable portion 114 begins popping up, transitioning to an extended position 140. The device 100 determines, based on sensor data 244 from the one or more Hall effect sensors, that an encoded position for the motor 160 corresponds to the second setpoint position, and thus ceases applying torque to the rotor (or reduces the torque applied, e.g. in some implementations torque may need to be applied to counteract the effect of gravity, while in some implementations a latch, mechanical latch, or other mechanism may be used to secure a rotor, gear, moveable portion 114, or other component when rotation and movement is not desired).

Subsequently, when a user presses down on a moveable portion 114 of a device 100 that is in the extended position 140, this causes torque to be applied in the second direction to a rotor of a motor 160 connected to the moveable portion 114. The motor 160 attempts to maintain the rotor in a rotational position corresponding to the setpoint which may result in an increase in voltage or current which can be measured.

In accordance with one or more preferred implementations, the device 100 determines that a measured voltage or current exceeds a second configured threshold (which may be the same as or different than the first configured threshold), and sets a second state flag (which may be the same flag as the first state flag or different) indicating that a transition to the first setpoint position should occur as soon as the user ceases pressing down on the moveable portion 114.

After the user ceases pressing down on the moveable portion 114, the device 100 determines, based on sensor data 244 from the one or more Hall effect sensors, that a current encoded position for the motor 160 deviates from the second setpoint position by less than a previous encoded position, or determines that a measured current voltage or current is less than a measured previous voltage or current. Based on one or both of these determinations, and based on the second state flag being set, the device 100 applies torque to the rotor in the second direction to transition the motor 160 to the first setpoint position.

In accordance with one or more preferred implementations, when a device 100 begins to transition to a different setpoint position, a rotation speed of the rotor is varied as a function of time or distance during rotation of the rotor. For example, a rotation speed of the rotor may begin at a first rate, and then increase to a second rate after a certain amount of time, or at a certain encoded position, or at a certain percentage of the way through a transition from a determined position at the start of the transition to a setpoint position. Consider the exemplary function "r(t)=sin t", where the rotational speed continually varies between 0 and 1 during the course of a transition from a determined position at the start of the transition to a setpoint position, or from a first setpoint position to a second setpoint position.

In accordance with one or more preferred implementations, a device 100 is user-configurable to allow a user to select a transition profile corresponding to a function or set of speeds for varying a rotation speed of a rotor through a transition from a determined position at the start of the transition to a setpoint position, or from a first setpoint position to a second setpoint position.

In accordance with one or more preferred implementations, this may be configured to be different for a transition from a first setpoint to a second setpoint as compared to a transition from the second setpoint to the first setpoint.

In accordance with one or more preferred implementations, a device 100 is configured to select or utilize a particular transition profile or function based on data corresponding to a user's touch of the device 100. For example, in accordance with one or more preferred implementations, a device 100 is configured to provide a faster transition in response to a more "forceful" touch, e.g. in response to a higher measured current or voltage, or a greater deviation of a current position from a setpoint position, or a deviation of a current position from a setpoint position that develops more quickly in time, or some combination thereof. Conversely, in accordance with one or more preferred implementations, a device 100 is configured to provide a slower transition in response to a less "forceful" touch, e.g. in response to a lower measured current or voltage, a smaller deviation of a current position from a setpoint position, a deviation of a current position from a setpoint position that develops less quickly in time, or some combination thereof.

In accordance with one or more preferred implementations, a device 100 is configured to utilize touch information, e.g. a higher measured current or voltage, or a greater deviation of a current position from a setpoint position, or a deviation of a current position from a setpoint position that develops more quickly in time, or some combination thereof, to differentiate between multiple users, and select or utilize a particular transition profile or function based thereon.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

In other implementations a spring-biased mechanism may be used to move the moveable portion 114 between the various positions. For example, instead of a motor 160, a helical spring may be used to provide a biasing force that maintains the moveable portion 114 in the extended position 140. Upon application of the applied force 124, the spring may be compressed and the moveable portion 114 may be moved by the applied force 124 to the desired position, such as the partially retracted position 142 or the retracted position 144. In some implementations, a magnetic latch, electromagnetic latch, latching member attached to an actuator, mechanical latch, and so forth may be used to maintain the moveable portion 114 in a particular position.

Figure 8:
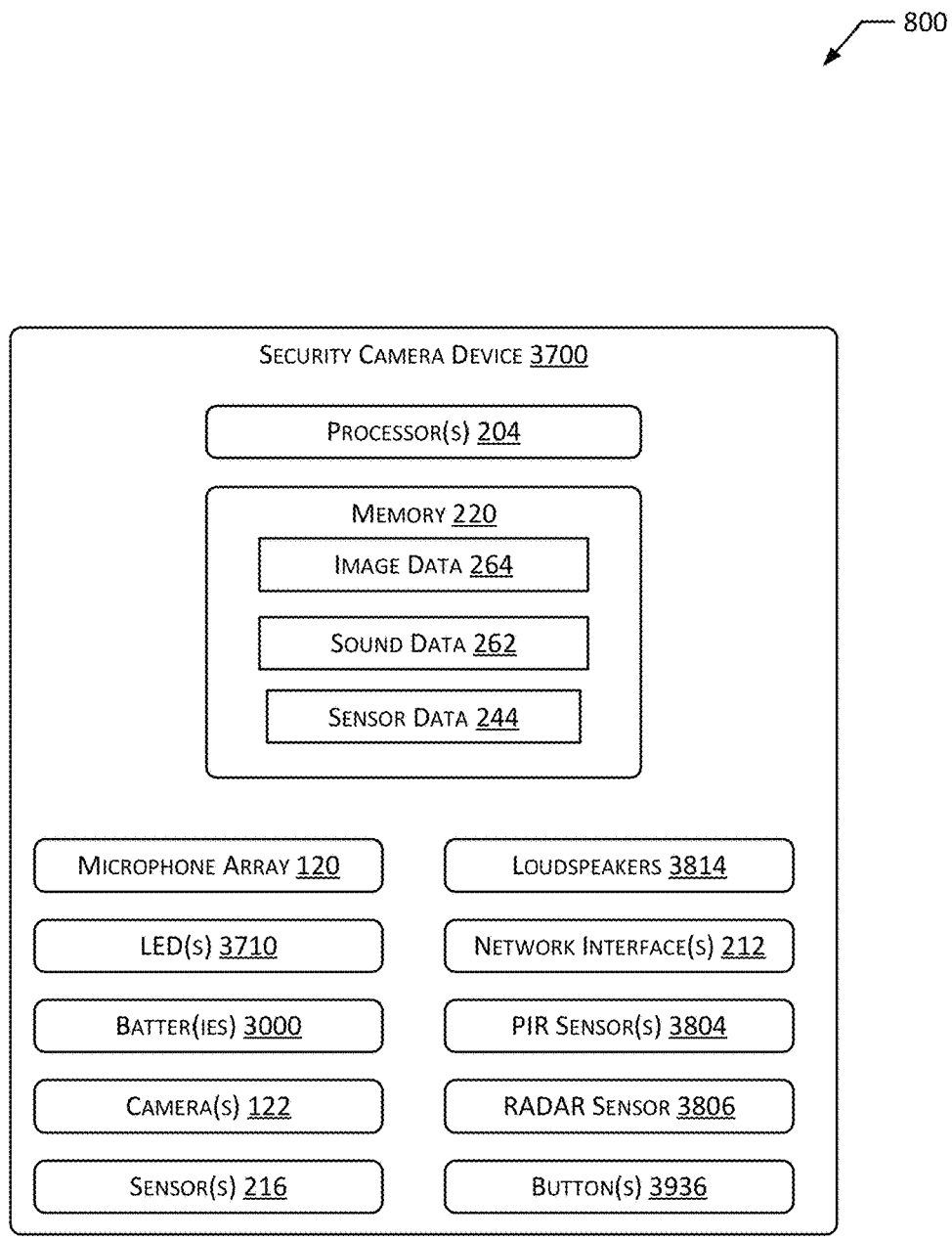
FIG. 8 illustrates a security camera device that may include a moveable portion and utilize the techniques and systems described herein, according to some implementations.

FIG. 8 illustrates at 800 select components of a security camera device 3700 that may include a moveable portion and utilize the techniques and systems described herein, according to some implementations. The security camera device 3700 is shown including processor(s) 204 and memory 220, where the processor(s) 204 may perform various functions associated with controlling an operation of the security camera device 3700, and the memory 220 may store instructions executable by the processor(s) 204 to perform the operations described herein.

The security camera device 3700 includes camera(s) 122 for capturing image data 264 within an environment of the security camera device 3700. The image data 264 may comprise still images, video, or a combination thereof. In some instances, the camera(s) 122 may include red, green, blue, depth (RGBD) camera(s), three-dimensional (3D) sensors, and so forth. Additionally, the security camera device 3700 may include any other sensor(s) 216 (e.g., ambient light sensor) that generates sensor data 244. Further, the security camera device 3700 may include Passive Infrared (PIR) sensor(s) 3804 and a RADAR sensor 3806 that generates the sensor data 244. In some instances, the PIR sensor(s) 3804 act as motion sensors for detecting movement within a field of view. The PIR sensor(s) 3804 may be secured on or within a PIR frame that may reside behind a lens (e.g., a Fresnel lens) of the security camera device 3700. In such examples, the PIR sensor(s) 3804 may detect IR radiation in a field of view of the PIR sensor(s) 3804, and produce an output signal (e.g., voltage) that changes as the amount of IR radiation in the field of view changes. The amount of voltage in the output signal may be compared, by the processor(s) 204, for example, to one or more threshold voltage values to determine if the amount of voltage in the output signal is indicative of motion, and/or if the amount of voltage in the output signal is indicative of motion of an entity that is to be recorded by the camera(s) 122. In some instances, the PIR sensor(s) 3804 may detect the motion for activating the camera(s) 122 and/or a microphone(s) 120 to begin capturing image data 264 and/or sound data 262, respectively.

In some instances, the PIR sensor(s) 3804 are used to detect motion within an environment of the security camera device 3700. However, in some instances, the camera(s) 122 and/or the RADAR sensor 3806, in addition to or alternative from the PIR sensor(s) 3804, may be used to detect motion. For example, computer vision techniques may be used to detect objects of interest. In some instances, the camera(s) 122 may include a complementary metal oxide semiconductor (CMOS) image sensor, and a digital processor that may perform embedded processing within a low-power processor, such that the low-power processor may output post-processed computer vision metadata to the processor(s) 204.

The metadata may include information such as the presence of a particular type of entity (e.g., person, animal, vehicle, parcel, etc.), a direction of movement of the entity, a distance of the entity from the security camera device 3700, etc. As a result of including the computer vision, the security camera device 3700 may leverage computer vision to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image.

The security camera device 3700 also includes LED(s) 3710, such as IR LEDs and/or white LEDs, for illuminating and/or emitting light within the environment of the security camera device 3700. Any number of IR LEDs and/or white LEDs may be included, and the IR LEDs and the white LEDs may be arranged about various sides of the security camera device 3700 (e.g., front, sides, etc.) In some instances, in response to the PIR sensor(s) 3804, the camera(s) 122, and/or the RADAR sensor 3806 detecting motion, the LED(s) 3710 may receive an output signal from the processor(s) 204 that causes the LED(s) 3710 to activate the one or more lights. The IR LEDs may also be used to detect motion and/or record image data 264 in low-light conditions.

The security camera device 3700 includes the microphone(s) 120 that generate sound data 262. The microphone(s) 120 may include an array of microphone for beamforming audio signals within the environment of the security camera device 3700. Loudspeaker(s) 3814 may output sound in a direction away from the security camera device 3700. The sound output by the loudspeaker(s) 3814 may include the sound data 262, which may be received from one or more communicatively coupled devices, or other audio (e.g., siren, alarm, etc.)

Network interface(s) 212 permit the security camera device 3700 to communicate over one or more networks. Example network interface(s) 212 include, without limitation, Wi-Fi, Bluetooth, ZigBee, Bluetooth Low Energy (BLE), LTE, and so forth. The network interface(s) 212 permit communication with remote device(s), such as mobile devices (e.g., phone), systems (e.g., cloud), and so forth. The network(s) may be representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

In some instances, inbound data may be routed through the network interface(s) 212 before being directed to the processor(s) 204, and outbound data from the processor(s) 204 may be routed through the network interface(s) 212. The network interface(s) 212 may therefore receive inputs, such as data, from the processor(s) 204, the camera(s) 122, the PIR sensor(s) 3804, the RADAR sensor 3806, button(s) 3936, and so forth. For example, when button(s) 3936 receive touch input, the network interface(s) 212 may perform one or more functions, such as to transmit a signal over a wireless connection and/or a wired connection. As another example, the network interface(s) 212 may be configured to transmit data to and/or receive data from one or more network devices. The network interface(s) 212 may act as a conduit for data communicated between various components and the processor(s) 204.

The security camera device 3700 may include the button(s) 3936 for controlling an operation of the security camera device 3700, such as a power button, a wireless connectivity button, a mute button, volume buttons, sync buttons, or any other type of button or control. The button(s) 3936, may in some instances, be multi-function buttons. The button(s) 3936 may be mechanical (e.g., having physically movable components) and/or electronic (e.g., capacitive sensors, optical sensors, touch screen, or the like).

Batter(ies) 3000 may power the components of the security camera device 3700. Any number of batter(ies) 3000 may be included, and the batter(ies) 3000 may be rechargeable/replaceable. Additionally, the security camera device 3700 may be powered using a source of external AC (alternating-current) power, such as mains power. When the batter(ies) 3000 are depleted, the batter(ies) 3000 may be recharged by connecting a power source to the batter(ies) 3000 (e.g., using a USB connector).

Although certain components of the security camera device 3700 are illustrated, it is to be understood that the security camera device 3700 may include additional or alternative components. For example, the security camera device 3700 may include other input/output devices (e.g., display screen), heat dissipating elements, computing components (e.g., PCBs), antennas, ports (e.g., USB), and so forth.

As used herein, a processor, such as the processor(s) 204 may include multiple processors and/or a processor having multiple cores. Further, the processor(s) 204 may comprise one or more cores of different types. For example, the processor(s) 204 may include application processor units, graphic processing units, and so forth. In one implementation, the processor(s) 204 may comprise a microcontroller and/or a microprocessor. The processor(s) 204 may include a graphics processing unit (GPU), a microprocessor, a digital signal processor or other processing units or components known in the art. Alternatively, or in addition to, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 204 may possess its own local memory 220, which also may store program components, program data, and/or one or more operating systems.

Memory, such as the memory 220 may include volatile and nonvolatile memory, removable and non-removable media implemented in any method or technology for storage of information, such as computer-readable instructions, data structures, a program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 220 may be implemented as computer-readable storage media ("CRSM"), which may be any available physical media accessible by the processor(s) to execute instructions stored on the memory 220. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 204.

In accordance with one or more preferred implementations, a camera device includes a passive infrared sensor.

A passive infrared sensor may comprise, for example, two pyroelectric sensing elements. Each pyroelectric sensing element comprises a pyroelectric crystal. Each pyroelectric sensing element generates an electrical charge in response to heat. Radiation (e.g. infrared light) received at a surface of a pyroelectric sensing element generates heat, which in turn generates an electrical charge. Put another way, an absorbing layer of a pyroelectric sensing element transforms radiation flux change into a change in temperature and a pyroelectric component performs a thermal to electrical conversion. One or more low-noise and low leakage current field-effect transistors (e.g. JFET) or operational amplifiers are used to convert charge into a signal voltage.

A passive infrared sensor may comprise two pyroelectric sensing elements electrically coupled together with opposite polarization to produce an output. In this way, an equal change in temperature at both of the pyroelectric sensing elements will cancel out in the output signal, thus filtering out temperature changes in the environment. However, a change in temperature at only one of the pyroelectric sensing elements will result in an output signal that is positive or negative (depending on which pyroelectric sensing element experienced the change in temperature).

A passive infrared sensor may include two slots, each providing an optical path to one of the pyroelectric sensing elements. A passive infrared sensor may comprise one or more lenses configured to direct light received at the one or more lenses onto one of the pyroelectric sensing elements. A passive infrared sensor may include one or more lenses configured to direct light received at a first portion of the one or more lenses (e.g. a left portion) onto a first of the pyroelectric sensing elements (e.g. a left sensing element), and to direct light received at a second portion of the one or more lenses (e.g. a right portion) onto a second of the pyroelectric sensing elements (e.g. a right sensing element). The one or more lenses may comprise one or more Fresnel lenses having one or more features configured to direct light. The pyroelectric elements may be positioned side by side and aligned along an axis (e.g. a horizontal axis or a vertical axis).

A passive infrared sensor may be analog, with an analog signal output, or may be digital, with digital data output generated utilizing an analog-to-digital converter (ADC).

An electronic device may include multiple passive infrared sensors that the electronic device uses to detect objects. For example, an electronic device may include two passive infrared sensors with a first infrared sensor positioned above a second infrared sensor.

Each passive infrared sensor may output a signal or sensor data 244, where the electronic device uses a characteristic determined using the signal or sensor data 244 to determine whether the passive infrared sensor detected an object. As described herein, the characteristic may include a voltage represented by the signal or sensor data 244, an amplitude of a wave generated or determined using the signal or sensor data 244, an angle of the wave generated using the signal or sensor data 244, and/or the like. The electronic device may then use characteristics determined using the signal or sensor data 244 from multiple passive infrared sensors to determine a distance to an object.

For example, a first passive infrared sensor may have a first field-of-view (FOV) that extends a first distance from the electronic device. In some examples, the first FOV is created based on placing the first passive infrared sensor in a first direction and/or using one or more lenses (which may be a lens of the passive infrared sensor or which may be used in addition to or in replacement of a lens of the passive infrared sensor). A second passive infrared sensor may have a second FOV that extends a second distance, further from the electronic device. In some examples, the second FOV is created by placing the first passive infrared sensor in a second direction and/or using one or more lenses (which may be a lens of the passive infrared sensor or which may be used in addition to or in replacement of a lens of the passive infrared sensor).

The electronic device may include one or more lenses configured to direct light received at various first portions of the one or more lenses onto a first of the passive infrared sensors (e.g. a top passive infrared sensor), and to direct light received at various second portions of the one or more lenses onto a second of the passive infrared sensors (e.g. a bottom passive infrared sensor). The one or more lenses may comprise one or more Fresnel lenses having one or more features configured to direct light. The passive infrared sensors may be positioned one above the other aligned along an axis (e.g. an axis perpendicular or orthogonal to an axis along which two pyroelectric sensing elements are aligned side by side) (e.g. a vertical axis).

In accordance with one or more preferred implementations, the first FOV and the second FOV are configured such that the first FOV will encompass a greater portion of a person that is located closer to the electronic device (as compared to the second FOV), while the second FOV will encompass a greater portion of a person that is located further away from the electronic device (as compared to the first FOV). Thermal radiation (comprising infrared light) from the extent of the person that is within the first FOV will be directed by one or more lenses onto the first passive infrared sensor.

For example, in accordance with one or more preferred implementations, as a person passes across the first FOV in a left to right direction, infrared light will be directed first onto a left pyroelectric sensing element of the first passive infrared sensor, causing the first passive infrared sensor to output a signal or data based thereon, and then infrared light will be directed onto a right pyroelectric sensing element of the first passive infrared sensor, causing the first passive infrared sensor to output a signal or data based thereon.

In accordance with one or more preferred implementations, an electronic device such as a camera device includes a location sensor in the form of a radar sensor, and the electronic device may use the one or more radar sensors to determine locations of an object(s) relative to the electronic device. The electronic device may then store, in a buffer memory, data (referred to as "location data") representing the locations of the object(s). A determination may be made as to whether the object is located within a physical space determined based on configuration settings (e.g. indicated by a user). Based on this, a message may be sent to a remote system, or image generation and analysis may be triggered. The remote system may send, to a user device, an alert or other notification. In accordance with one or more preferred implementations, sensor data 244 from one or more PIR sensors 3804 may be used to trigger powering on of one or more radar sensors 3806. In accordance with one or more preferred implementations, sensor data 244 from radar sensors 3806 and/or PIR sensors 3804 may be used to determine whether to power on a camera 122, pop-up a camera 122, begin image analysis, or send an alert.

Additionally, the electronic device may use an imaging device to generate image data 264 and analyze the image data 264 in order to determine an object of interest represented by the image data 264. In some cases, this may be done upon detecting motion using a PIR sensor 3804, radar sensor 3806, or within the image information. The electronic device (and/or remote system) may then match the object in the image to one of the objects detected using the location sensor(s). Based on the match, the remote system may send, to a user device, an alert or other notification. Such an alert may include any suitable information, such as the image data 264 along with the location data representing the locations of the object. The user device may then use a GUI to display the video represented by the image data 264. Additionally, along with the video, the user device may display a map of an environment for which the electronic device is located. In some embodiments, the electronic device may use the location data to indicate, on the map, the locations of the object. This way, the user is able to view both the video of the object as well as the location information describing the motion of the object while at the environment.

In accordance with one or more preferred implementations, at a first time T(1), an electronic device may use a radar sensor to determine that an object is located at a first location relative to the electronic device. The electronic device may then generate location data representing the first location of the object. Additionally, at a second time T(2), the electronic device may use the location sensor to determine that the object is located at a second location relative to the electronic device. The electronic device may then generate location data representing the second location of the object. Additionally, the electronic device may perform similar processes to generate location data representing a third location of the object at a third time T(3), a fourth location of the object at a fourth time T(4), and a fifth location of the object at a fifth time T(5). Furthermore, the electronic device may perform similar processes to generate location data representing locations of the object between the times T(1)-T(5).

For more detail about the location sensor, the electronic device may include at least a radar sensor 3806 that the electronic device uses to determine locations of objects, such as the object, within a given distance to the electronic device. The given distance may include, but is not limited to, 15 feet, 30 feet, 48 feet, 70 feet, and/or any other distance. To determine the locations of the object, the radar sensor 3806 includes at least one antenna that is configured to transmit signals and at least two antennas (which may include the at least one antenna) that are configured to receive the signals after the signals are reflected off objects. The at least one antenna may transmit the signals at a given frame rate and/or the at least two antennas may receive the signals at the given frame rate. As described herein, a frame rate for the location sensor may include, but is not limited to, 10 frames per second, 15 frames per second, 30 frames pers second, and/or any other frame rate. After receiving the reflected signals, the radar sensor 3806 may process each reflected signal in order to measure how strong the reflected signal is at given distances.

For example, and for a given frame that corresponds to the object located at the first location, the output from the radar sensor 3806, which may be referred to "output data," may represent the amplitude values at various bins, where each bin corresponds to a given distance from the electronic device. The number of bins may include, but is not limited to, 50 bins, 100 bins, 150 bins, and/or any other number of bins. The distance between each bin may include, but is not limited to, 20 centimeters, 22.5 centimeters, 25 centimeters, 30 centimeters, and/or any other distance. Next, the electronic device may analyze the output data in order to remove reflections of the signals that were caused by stationary objects within the environment, such as a tree. In order to remove reflections from the stationary objects, the electronic device may subtract at least one previous frame from the given frame. The result of the subtraction may indicate the changes in the amplitude over a period of time (e.g., from frame to frame). The electronic device may then use the results to identify a bin that is associated with a moving object, such as the object. Additionally, the electronic device may use the distance associated with the bin to determine the distance to the object at the first location. The electronic device may perform similar processes over a period of time in order to track the distances of the object. In some examples, the electronic device may perform similar processes to track the distances of multiple objects.

The electronic device may also use the horizontal separation of the antennas to determine angle-of-arrival information for each distance bin per frame. For example, if the electronic device takes the maximum peak from each frame as a target, the electronic device may reconstruct how the object moves through the environment. Examples of how the radar sensor generates the output data and how the electronic device uses the output data to determine the distances and the angles to object(s) will now be described.

Figure 9A:
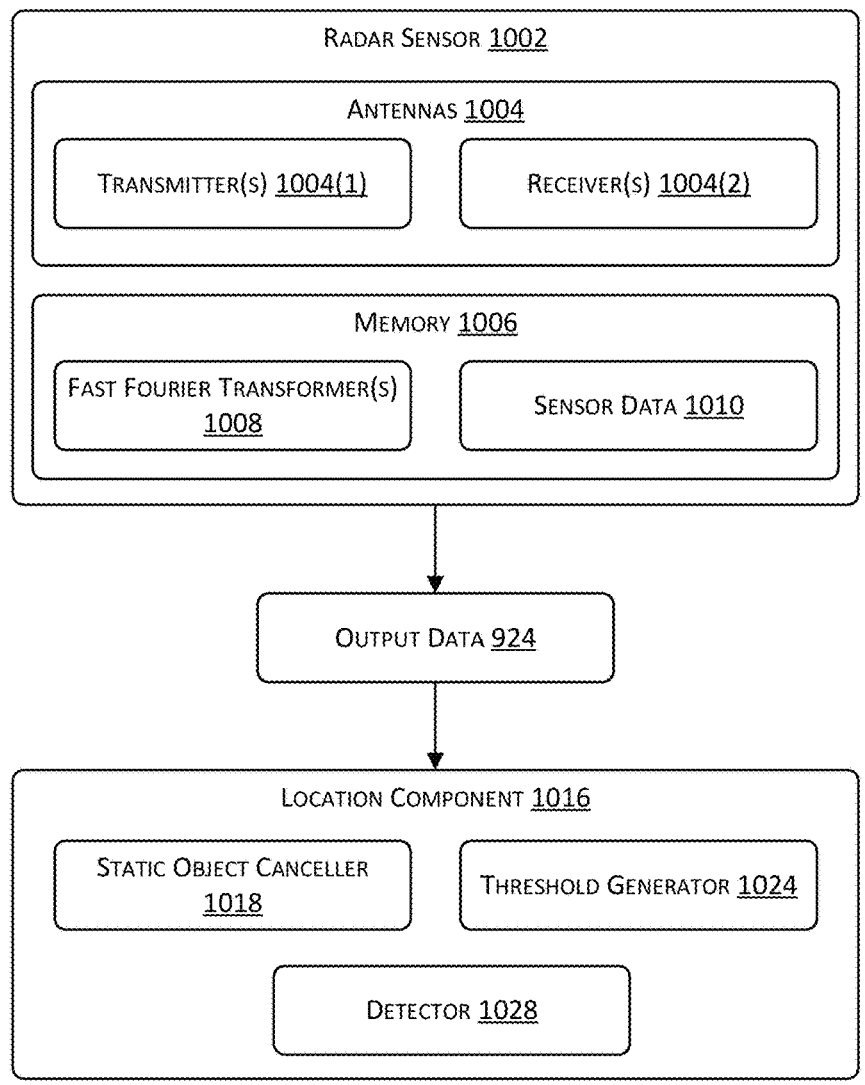
FIG. 9A is a block diagram of a location sensor, according to some implementations.

FIG. 9A is a block diagram 9A00 of a location sensor and associated architecture, according to various examples of the present disclosure. Referring to FIG. 9A, the location sensor includes a radar sensor 1002 that includes antennas 1004 and memory 1006. The memory 1006 includes at least one Fast Fourier Transformer(s) (FFT(s)) 1008. While the example of FIG. 9A illustrates transmitters 1004(1) as being separate from receivers 1004(2), in other examples, the receivers 1004(2) may include the transmitters 1004(1). Additionally, while the example of FIG. 9A illustrates the FFT(s) 1008 as being included in the memory 1006, in other examples, the FFT(s) 1008 may not be included in the memory 1006.

Figure 9B:
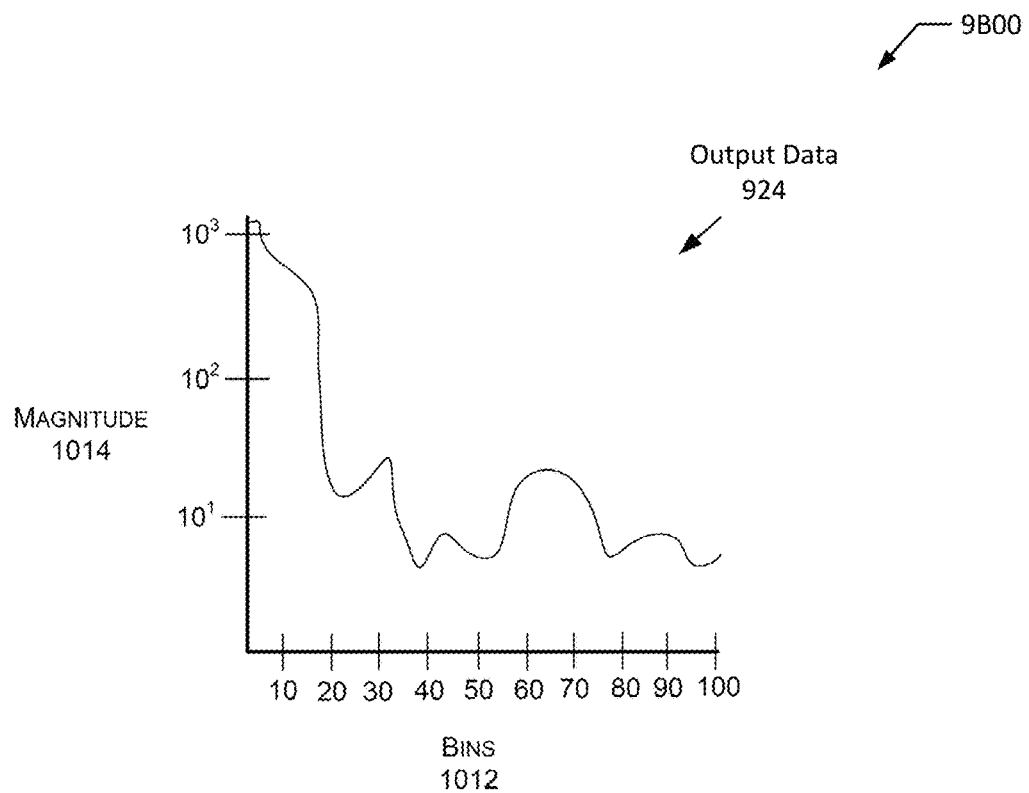
FIG. 9B depicts graphs of output data used by the security camera device to determine a dynamic object, according to some implementations.
Figure 9B:
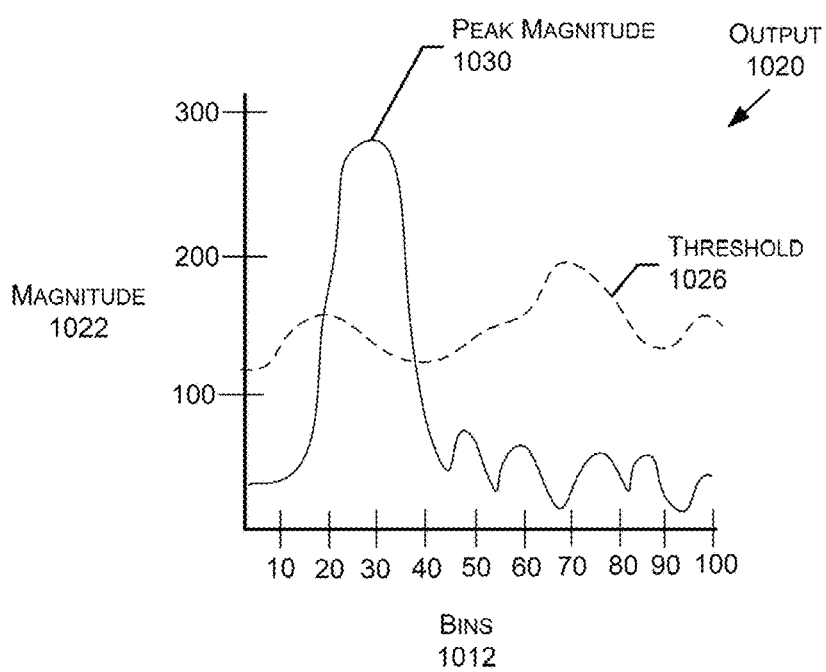

In some examples, each frame output by the transmitter(s) 1004(1) consists of a signal that represents a chirp. The transmitter(s) 1004(1) output the signal, which is reflected off of at least one object, and then received by the receivers 1004(2), which generate sensor data 1010 representing the signal. The sensor data 1010 is then passed to the FFT(s) 1008 for processing. For example, the FFT(s) 1008 include one or more algorithms that are configured to convert a time domain and/or space domain from the signal to a representation in a frequency domain. The output is a measure of how strong the reflected signal is at a specific distance from the electronic device. In some examples, each frequency bin of the FTT(s) 1008 corresponds to a physical distance away the electronic device. For example, and as illustrated in FIG. 9B, output data 924 representing a frame may include one hundred bins 1012, where each bin 1012 represents a distance (e.g., 22.5 centimeters) from the electronic device. The output data 924 further represents a magnitude 1014 of the frequency of the signal at each of the bins 1012. A location component 1016 may then use the output data 924 to determine a distance of an object relative to the electronic device.

For example, as shown at 9B00, since the output data 924 represents the magnitude for all objects, a static object canceller 1018 may be configured to subtract output data 924 representing a previous frame (and/or output data 924 representing more than one previous frame) from the current output data 924. Based on the subtraction, the static object canceller 1018 may generate an output 1020 that represents a magnitude 1022 of dynamic objects. In some examples, a threshold generator 1024 may then generate a threshold magnitude level 1026 associated with detecting objects. In some examples, the threshold generator 1024 generates the threshold magnitude level ("threshold") 1026 using one or more algorithms, such as a constant false alarm rate (CFAR) algorithm. For instance, the threshold generator 1024 may generate the threshold magnitude level 1026 by taking the average of the magnitudes detected by the radar sensor 1002 over a period of time. The period of time may include, but is not limited to, one minute, five minutes, one hour, one day, and/or any other period of time. Additionally, or alternatively, in some examples, the threshold generator 1024 generates the threshold magnitude level 1026 by multiplying the average of the magnitudes by a given multiplier. The multiplier may include, but is not limited to, 1.2, 1.5, 2, 3, and/or any other multiplier.

For a first example, a cell-averaging CFAR algorithm may determine the threshold magnitude level 1026 by estimating the level of noise around a cell under test. In some examples, the cell-averaging CFAR algorithm estimates this level of noise by calculating an average magnitude of a block of cells around the cell under test. In some examples, the cell-averaging CFAR algorithm further ignores cells that are immediately adjacent to the cell under test. Additionally, in some examples, the cell-averaging CFAR algorithm increases the average magnitude by the multiplier. The cell-averaging CFAR algorithm then performs similar processes for each of the cells in order to determine the threshold magnitude level 1026.

For a second example, the threshold generator 1024 may use the greatest-of CFAR algorithm that calculates separate averages for cells to the left and right of a cell under test. The greatest-of CFAR algorithm may then use the greatest of these magnitudes to define the local magnitude at the cell. The greatest-of CFAR algorithm may perform similar processes for each cell in order to determine the threshold magnitude level 1026. Still, for a third example, the threshold generator 1024 may use the least-of CFAR algorithm that again calculates separate averages for cells to the left and right of a cell under test. However, the least-of CFAR algorithm may then use the least of these magnitudes to define the local magnitude at the cell. The least-of CFAR algorithm may perform similar processes for each cell in order to determine the threshold magnitude level 1026.

A detector 1028 may then analyze the output 1020 in order to identify at least one peak magnitude that satisfies the threshold magnitude level 1026. For example, and in the example of FIG. 9B, the detector 1028 may identify a peak magnitude 1030 around bin 1012 thirty-two that satisfies the threshold magnitude level 1026. Based on identifying the peak magnitude 1030, the detector 1028 may detect a dynamic object. Additionally, the detector 1028 may analyze the output 1020 to determine a distance to the object. In some examples, the detector 1028 may determine the distance by multiplying the bin 1012 for which the peak magnitude 1030 was detected by the distance associated with each bin 1012. For instance, and in the example of FIG. 9B, the detector 1028 may determine that the distance is 720 centimeters (e.g., 32×22.5). The detector 1028 may then output data representing the distance to the object.

The location component 1016 may also determine an angle to the object. For example, the detector 1028 may use the one or more algorithms, along with the horizontal separation between the receivers 1004(2), to convert the time domain from the signal to output phase information for determining the angle. For example, assume that a complex vector for a first receiver channel is $C_1$ and that a complex vector for a second receiver channel is $C_2$. The detector 1028 may then determine a complex conjugate Y as (conjugate $(C_1) \times C_2$) and a phase difference P is derived as (a tan 2(imag(Y), real(Y)). In some examples, the detector 1028 may determine a moving average of the phase difference.

The detector 1028 may then convert the phase difference P to the angle A using the following equation:

$$A = \sin^{-1}\left(\frac{W(P)}{2\pi d}\right) \quad (1)$$

In equation (1), w is the wavelength (e.g., 12.4 mm) and d is the distance between the antennas 1004 (e.g., 5.76 mm). While this is just one example of how to determine the angle, in other examples, the detector 1028 may use additional and/or alternative techniques.

The location component 1016 may then output the intermediary output data 924 that represents the distances and the angles. In some examples, the location component 1016 may be included within the radar sensor 1002. Additionally, or alternatively, in some examples, the location component 1016 is included within the memory 220 of the electronic device. Additionally, in the examples of FIGS. 9A-9B, the radar sensor 1002 may include, but is not limited to, a bistatic location sensor, a doppler location sensor, a monopulse location sensor, a passive location sensor, an instrumentation location sensor, a continuous wave location sensor, and/or any other type of radar. For example, the radar sensor 1002 may include a SOCIONEXT SARINIA (e.g., SC1233AR3) location sensor, an SMR-SERIES location sensor, an InnoSenT location sensor, an ISYS location sensor, and/or any other location sensor.

In some examples, and since each location is represented as polar coordinates (e.g., a distance and range), the electronic device may then convert the polar coordinates for each location into cartesian coordinates. For example, and for the first location, the electronic device may convert the distance and the range associated with the first location to a first cartesian coordinate (e.g., a first distance) along a first axis (e.g., the "x-axis") relative to the electronic device and a second cartesian coordinate (e.g., a second distance) along a second axis (e.g., the y-axis) relative to the electronic device. For example, the electronic device may determine the coordinates using the following equations:

$$d \times \cos(a) = \text{first coordinate} \quad (2)$$

$$d \times \sin(a) = \text{second coordinate} \quad (3)$$

In the equations above, d may include the distance and a may include the angle for the first location. Additionally, in some examples, the electronic device may use the height of the electronic device on the structure when determining the cartesian coordinates. For example, a user may input the height into the user device. The user device may then send data representing the height to the remote system, which may then send the data to the electronic device. The electronic device may then determine a new distance, d', using the height, h, by the following equation:

$$\sqrt{d^2 + h^2} = d' \quad (4)$$

When using the height to determine the new distance, the electronic device may then use the new distance, d', in equations (1) and (2) above instead of the original distance, d, when determining the cartesian coordinates.

The electronic device may perform similar processes in order to convert the global coordinates for each of the other locations to cartesian coordinates. The electronic device may then generate and store the location data representing the cartesian coordinates in one or more buffers. In some examples, the electronic device stores the location data that is associated with a most recent time period in one or more buffers. The time period may include, but is not limited to, 5 seconds, 6 seconds, 10 seconds, and/or any other time period. In some examples, the one or more buffers may include a rolling buffer, where the electronic device may begin to override the oldest location data as the electronic device continues to generate and store new location data.

The electronic device may also use an imaging device in order to generate image data representing the object. In some examples, the electronic device is continuously generating the image data using an imaging device. For example, the electronic device may continuously provide power to the imaging device such that the imaging device is activated (e.g., turned on) and generating the image data at all times. In other examples, the electronic device may begin to generate the image data based on detecting the occurrence of an event. As described herein, an event may include, but is not limited to, detecting an object (e.g., a dynamic object) within a threshold distance to the electronic device, receiving an input using an input device (e.g., receiving an input to a button), receiving a command from the remote system to begin generating the image data, and/or any other event. As described herein, a dynamic object may include any object that is moving. For example, a dynamic object may include, but is not limited to, a person, an animal, a car, and/or any other moving object.

The electronic device may begin to generate the image data and/or begin to analyze the image data based on detecting motion of the object within a threshold distance to the electronic device. For instance, the electronic device may generate the image data and/or begin to analyze the image data based on detecting that the object is located at the second location at the second time T(2). The threshold distance may include, but is not limited to, 10 feet, 15 feet, 20 feet, and/or any other distance. In some examples, the electronic device is preprogrammed with the threshold distance. In other examples, the electronic device may receive data representing the threshold distance (e.g., the user of the electronic device may set the threshold distance). In some examples, the electronic device may continue to generate and/or analyze the image data until detecting another event. As described herein, the other event may include, but is not limited to, no longer detecting an object (e.g., a dynamic object) within the threshold distance to the electronic device, no longer detecting motion, receiving an additional command from the remote system to cease generating the image data, and/or any other type of event.

To analyze the image data, the electronic device may use one or more techniques, such as one or more computer-vision and/or object detection techniques, in order to determine that the image data represents a type of object. In some examples, the type of object may include a general object such as, but is not limited to, a person, a vehicle, a package, an animal, and/or any other type of object. Additionally, in some examples, the type of object may include a specific type of object. For example, the type of object may include a specific person (e.g., a parent), a specific animal (e.g., the family dog), a specific type of vehicle (e.g., a delivery truck), and/or the like.

Based on the determination that the image data represents the object (and/or the type of object), the electronic device may determine that the location data is associated with the object represented by the image data. For example, the electronic device may generate a hypothesis that the location data is associated with the object. The electronic device may then use the locations represented by the location data and the locations of the object determined using the image data to determine a score for the hypothesis. For example, if the locations represented by the location data are similar to the locations of the object determined using the image data, then the electronic device may increase the score. However, if the locations represented by the location data are not similar to the locations of the object determined using the image data, then the electronic device may decrease the score. The electronic device may then use the score to determine if the location data is associated with the object. The electronic device may determine, based on the score, that the location data is associated with the object.

Some of the present embodiments may comprise computer vision for one or more aspects, such as object and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data is scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)-Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Typical functions and components (e.g., hardware) found in many computer vision systems are described in the following paragraphs. The present embodiments may include at least some of these aspects. A computer vision module may include any of the components (e.g., hardware) and/or functionality described herein with respect to computer vision, including, without limitation, one or more cameras, sensors, and/or processors.

Image acquisition-A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing-Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that an image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: lines, edges, and ridges; localized interest points such as corners, blobs, or points; or more complex features may be related to texture, shape, or motion.

Detection/segmentation—At some point in the processing a decision may be made about which image points or regions of the image are relevant for further processing. Examples are: selection of a specific set of interest points; segmentation of one or multiple image regions that contain a specific object of interest; or segmentation of the image into a nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: verification that the data satisfy model-based and application-specific assumptions; estimation of application-specific parameters, such as object pose or object size; image recognition-classifying a detected object into different categories; or image registration-comparing and combining two different views of the same object.

Decision making—Making the final decision required for the application, for example match/no-match in recognition applications.

One or more of the present embodiments may include a vision processing unit (may be a component of the computer vision module). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All of these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometric authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, the computer vision module and/or the camera and/or the processor may receive information about the person using any one, or any combination of more than one, of the foregoing biometrics.

In accordance with one or more preferred implementations, machine learning techniques, such as those described herein, may be used to form predictions, solve problems, recognize objects in image data for classification, etc. For example, machine learning techniques may be used to detect objects represented in image data and/or translate text from one spoken language to another. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learning models, such as neural networks, parameters control activations in neurons (or nodes) within layers of the machine learning models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

Transformer models are machine learning models that typically include an encoder network and a decoder network. The encoder takes an input and generates feature representations (e.g., feature vectors, feature maps, etc.) of the input. The feature representation may then be fed into a decoder that may generate output embedding data based on the encodings. For example, in natural language processing, transformer models take sequences of words as input. A transformer may receive a sentence and/or a paragraph comprising a sequence of words as an input. In some examples, a transformer may receive a time series of data captured at various different times (e.g., frames of a video) as input. In various examples described herein, a vision transformer (e.g., ViT) may receive frames of two-dimensional image data (e.g., from video) as input and may encode the input data into a numerical vector (e.g., embedding data).

The encoder network of a transformer comprises a set of encoding layers that processes the input data one layer after another. Each encoder layer generates encodings (referred to herein as "tokens"). These tokens include feature representations (e.g., feature vectors and/or maps) that include information about which parts of the input data are relevant to each other. For example, for an input image the encoder layers may determine which parts of the image are relevant to other parts of the image (and/or, in some cases, to other images received as part of the input data). Each encoder layer passes its token output to the next encoder layer. The decoder network takes the tokens output by the encoder network and processes them using the encoded contextual information to generate an output (e.g., the aforementioned one-dimensional vector of tokens). The output data may be used to perform task-specific functions (e.g., object detection, velocity prediction, the next word in a sentence, etc.). To encode contextual information from other inputs (e.g., combined feature representation), each encoder and decoder layer of a transformer uses an attention mechanism, which for each input, weighs the relevance of every other input and draws information from the other inputs to generate the output. Each decoder layer also has an additional attention mechanism which draws information from the outputs of previous decoders, prior to the decoder layer determining information from the encodings. Both the encoder and decoder layers have a feed-forward neural network for additional processing of the outputs, and contain residual connections and layer normalization steps.

In accordance with one or more preferred implementations, the basic building blocks of the transformer are scaled dot-product attention units. When input data is passed into a transformer model, attention weights are calculated between every token simultaneously. The attention unit produces embeddings for every token in context that contains information not only about the token itself, but also a weighted combination of other relevant tokens weighted by the attention weights.

Concretely, for each attention unit the transformer model learns three weight matrices; the query weights $W_Q$, the key weights $W_K$, and the value weights $W_V$. For each token, the input embedding $x_i$ is multiplied with each of the three weight matrices to produce a query vector $q_i=x_iW_Q$, a key vector $k_i=x_iW_K$, and a value vector $v_i=x_iW_V$. Attention weights are calculated using the query and key vectors: the attention weight $a_{ij}$ from a token is the dot product between $q_i$ and $k_j$. The attention weights are divided by the square root of the dimension of the key vectors, $\sqrt{d_k}$, which stabilizes gradients during training, and passed through a softmax layer that normalizes the weights. The fact that $W_Q$ and $W_K$ are different matrices allows attention to be non-symmetric: if token i attends to token j, this does not necessarily mean that token j will attend to token i. The output of the attention unit for token i is the weighted sum of the value vectors of all tokens, weighted by $a_{ij}$, the attention from i to each token.

The attention calculation for all tokens can be expressed as one large matrix calculation, which is useful for training due to computational matrix operation optimizations which make matrix operations fast to compute. The matrices Q, K, and V are defined as the matrices where the ith rows are vectors $q_i$, $k_i$, and $v_i$ respectively.

$$\text{Attention}(Q, K, V) = \text{softmax}\left(\frac{QK^T}{\sqrt{d_k}}\right)V \quad (5)$$

One set of ($W_Q$, $W_K$, $W_V$) matrices may be referred to as an attention head, and each layer in a transformer model may have multiple attention heads. While one attention head attends to the other tokens that are relevant to each token, with multiple attention heads the model can learn to do this for different definitions of "relevance." The relevance encoded by transformers can be interpretable by humans. For example, in the natural language context, there are attention heads that, for every token, attend mostly to the next word, or attention heads that mainly attend from verbs to their direct objects. Since transformer models have multiple attention heads, they have the possibility of capturing many levels and types of relevance relations, from surface-level to semantic. The multiple outputs for the multi-head attention layer are concatenated to pass into the feed-forward neural network layers.

Each encoder comprises two major components: a self-attention mechanism and a feed-forward neural network. The self-attention mechanism takes in a set of input encodings from the previous encoder and weighs their relevance to each other to generate a set of output encodings. The feed-forward neural network then further processes each output encoding individually. These output encodings are finally passed to the next encoder as its input, as well as the decoders.

The first encoder takes position information (e.g., macroblock locations in the context of image data) and embeddings of the input data as its input, rather than encodings. The position information is used by the transformer to make use of the order of the input data. In various examples described herein, the position embedding may describe a spatial relationship of a plurality of tokens relative to other tokens. For example, an input token may represent a 16×16 block of pixels from an input frame of image data. The position embedding may describe a location within the frame of the 16×16 block of pixels (e.g., relative to other tokens representing other portions of the frame). Accordingly, rather than a one-dimensional position embedding (as in the natural language context wherein the position of a word in a one-dimensional sentence/paragraph/document is defined), the various techniques described herein describe two-dimensional and/or higher-dimensional position embeddings that describe the spatial location of a token within the input data (e.g., a two-dimensional position within a frame, a three-dimensional position within a point cloud, etc.) and/or the temporal location of the token (e.g., a timestamp and/or frame number within a video). In various examples, the first encoder may learn a position embedding for each token in a frame of input data (e.g., 2D input data and/or 3D input data), and a position embedding for each timestamp (e.g., a temporal position of the token when the input data is time series data such as video and/or frames of image data captured over time). The sum of the position embedding and the timestamp may then be used to generate an embedding representing the token's position and temporal information.

Each decoder layer comprises three components: a self-attention mechanism (e.g., scaled dot product attention), an attention mechanism over the encodings, and a feed-forward neural network. The decoder functions in a similar fashion to the encoder, but an additional attention mechanism is inserted which instead draws relevant information from the encodings generated by the encoders. In a self-attention layer, the keys, values, and queries come from the same place—in this case, the output of the previous layer in the encoder. Each position in the encoder can attend to all positions in the previous layer of the encoder. In "encoder-decoder attention" layers (sometimes referred to as "cross-attention"), the queries come from the previous decoder layer, and the keys and values come from the output of the encoder. This allows every position in the decoder to attend over all positions in the input sequence. The decoder is attending to the encoder features.

In some examples described herein, a pre-trained Vision Transformer (e.g., ViT as described in "An Image is Worth 16×16 Words: Transformers for Image Recognition at Scale" Dosovitskiy et al.; arxiv.org/abs/2010.11929) and/or another image-based transformer may be used to generate embeddings representing one or more frames of input image data. The resulting embeddings may be used to determine whether or not an event has occurred. In some examples discussed herein, a transformer-based encoder is used to generate embedding data representing frames of image data. However, it should be noted that other image encoders may instead be used. For example, a convolutional neural network (CNN) and/or other image encoder network may instead be used to generate embedding data that represents input images. In some examples, lighter-weight models such as CNNs may be advantageous when deployment of such models on edge devices is desired. However, embedding data generated using transformer-based models may include richer semantic information and may thus offer enhanced capability for downstream actions.

Figure 10:
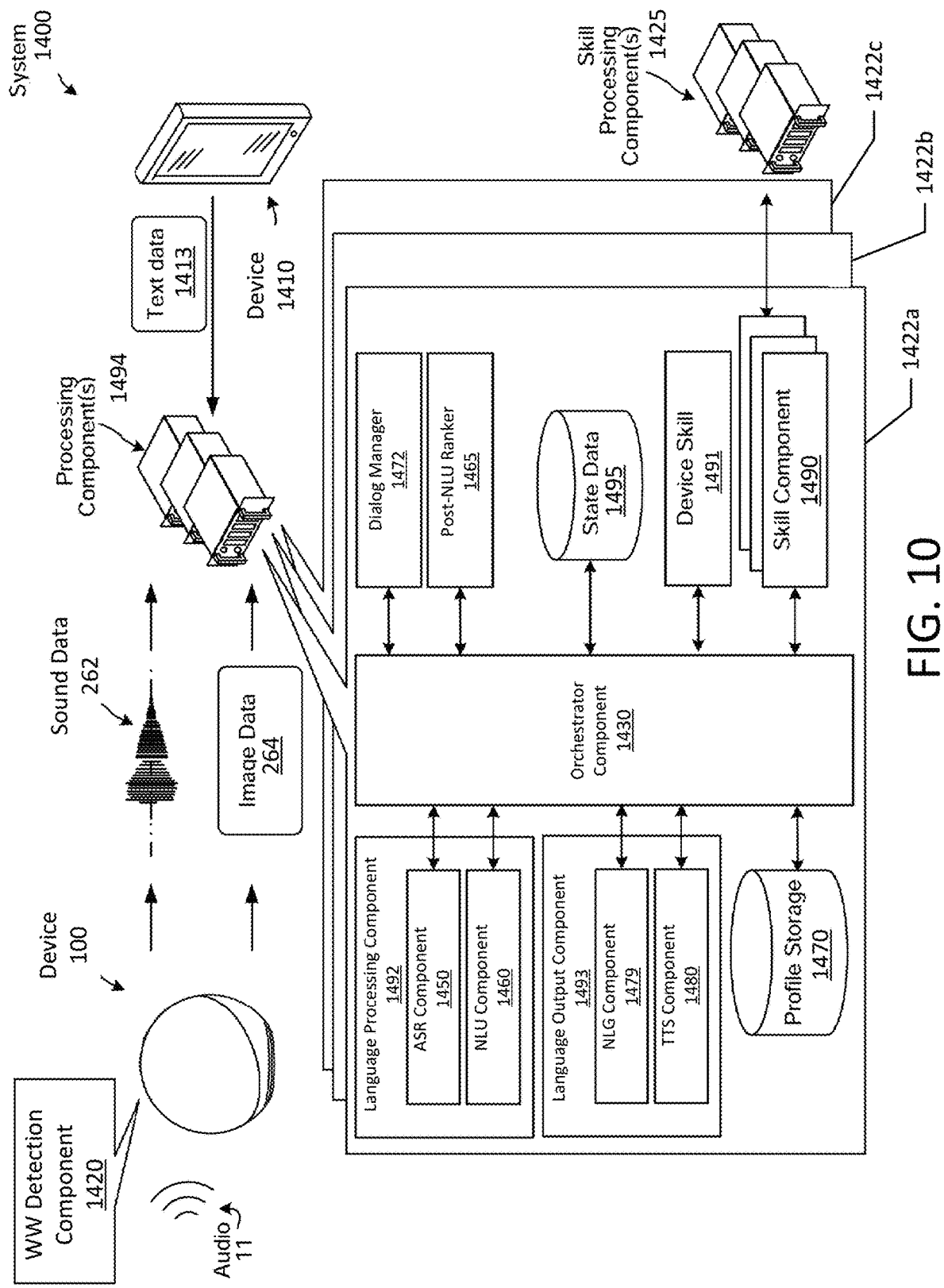
FIG. 10 is a block diagram of a system to operate in conjunction with the device, according to some implementations.

FIG. 10 is a block diagram of a system 1400 to operate in conjunction with the device 100, according to some implementations. The various components of the system 1400 may be located on same or different physical devices. Communication between various components may occur directly or across a network(s). The device 100 may include audio capture component(s), such as a microphone or array of microphones 120 of a device 100, captures audio 11 and creates corresponding audio data. Once speech is detected in audio data representing the audio 11, the device 100 may determine if the speech is directed at the device 100 or the system 1400. In at least some embodiments, such determination may be made using a wakeword detection component 1420. The wakeword detection component 1420 may be configured to detect various wakewords. In at least some examples, a wakeword may correspond to a name of a different digital assistant. An example wakeword or digital assistant name is "Alexa." In another example, input to the system 1400 may be in the form of text data 1413, for example as a result of a user typing an input into a user interface of the device 100. Other input forms may include an indication that the user has pressed a physical or virtual button on the device 100, the user has made a gesture, etc. The device 100 may also capture images using a camera(s) 122 of the device 100 and may send image data 264 representing those image(s) to the system 1400. The image data 264 may include raw image data or image data processed by the device 100 before sending to the system 1400.

The wakeword detection component 1420 of the device 100 may process the audio data, representing the audio 11, to determine whether speech is represented therein. The device 100 may use various techniques to determine whether the audio data includes speech. In some examples, the device 100 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 100 may implement a classifier configured to distinguish speech from background noise. The classifier may be implemented by techniques such as linear classifiers, support vector machines, and decision trees. In still other examples, the device 100 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection may be performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 1420 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 1420 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 1420 and/or input is detected by an input detector, the device 100 may "wake" and begin transmitting sound data 262, representing the audio 11, to the system(s) 1400. The sound data 262 may include data corresponding to the wakeword; in other embodiments, the portion of the audio corresponding to the wakeword is removed by the device 100 prior to sending the sound data 262 to the system(s) 1400. In the case of touch input detection or gesture based input detection, the audio data may not include a wakeword.

In some implementations, the system 1400 may include more than one system 1400. The systems 1400 may respond to different wakewords and/or perform different categories of tasks. A system 1400 may be associated with its own wakeword such that speaking a certain wakeword results in audio data being sent to and processed by a particular system 1400. For example, detection of the wakeword "Alexa" by the wakeword detection component 1420 may result in sending audio data to system 1422*a* for processing while detection of the wakeword "Galadriel" by the wakeword detection component 1420 may result in sending audio data to system 1422*b* for processing. The system 1400 may have a separate wakeword and system for different skills/systems (e.g., "Game Master" for a game play skill/system 1422*c*) and/or such skills/systems may be coordinated by one or more skill component(s) 1490 of one or more systems 1422.

Upon receipt by the system(s) 1422, the sound data 262 may be sent to an orchestrator component 1430. The orchestrator component 1430 may include memory and logic that enables the orchestrator component 1430 to transmit various pieces and forms of data to various components of the system 1400, as well as perform other operations as described herein.

The systems 1422 may include various components for processing natural language commands. A system 1422 may include a language processing component 1492 for performing operations related to understanding natural language such as ASR, NLU, entity resolution, etc. The system 1422 may include a language output component 1493 for performing operations related to generating a natural language output, such as TTS. The system 1422 may also include a component to track system state data 1495. Such system state data 1495 may indicate the state of operations of the respective system 1422 for example with respect to a particular device 100, user profile, or the like. For example, state data 1495 may include dialog data, indications of previous utterance(s), whether the system 1422 has any ongoing processes for the device 100/user profile, or the like. The system 1422 may include one or more skill components 1490. The skill components 1490 may perform various operations related to executing commands such as online shopping, streaming media, controlling smart-home appliances, and the like.

The system 1422 may include a language output component 1493. The language output component 1493 includes a natural language generation (NLG) component 1479 and a text-to-speech (TTS) component 1480. The NLG component 1479 can generate text for purposes of TTS output to a user. For example, the NLG component 1479 may generate text corresponding to instructions corresponding to a particular action for the user to perform. The NLG component 1479 may generate appropriate text for various outputs as described herein. The NLG component 1479 may include one or more trained models configured to output text appropriate for a particular input. The text output by the NLG component 1479 may become input for the TTS component 1480 (e.g., output text data 1413 discussed below). Alternatively, or in addition, the TTS component 1480 may receive text data from a skill component 1490 or other system component for output.

The NLG component 1479 may include a trained model. The NLG component 1479 generates text data 1413 from dialog data received by the dialog manager 1472 such that the output text data 1413 has a natural feel and, in some embodiments, includes words and/or phrases specifically formatted for a requesting individual. The NLG system may use templates to formulate responses. And/or the NLG system may include models trained from the various templates for forming the output text data 1413. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG system may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 1480.

The TTS component 1480 may generate audio data (e.g., synthesized speech) from text data using one or more different methods. Text data input to the TTS component 1480 may come from a skill component 1490, the orchestrator component 1430, or another component of the system 1422. In one method of synthesis called unit selection, the TTS component 1480 matches text data against a database of recorded speech. The TTS component 1480 selects matching units of recorded speech and concatenates the units together to form audio data. In another method of synthesis called parametric synthesis, the TTS component 1480 varies parameters such as frequency, volume, and noise to create audio data including an artificial speech waveform. Parametric synthesis uses a computerized voice generator, sometimes called a vocoder. The TTS component 1480 may be capable of generating output audio representing natural language speech in one or more natural languages (e.g., English, Mandarin, French, etc.).

The system 1400 (either on the device 100, system 1422, or a combination thereof) may include profile storage for storing a variety of information related to individual users, groups of users, devices, etc. that interact with the system 1400. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 1470 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 1410, the user profile (associated with the presented login information) may be updated to include information about the device 1410, for example with an indication that the device 1410 is currently in use. Each user profile may include identifiers of skills that the user has enabled. When a user enables a skill, the user may give the system 1422 permission to allow the skill to execute with respect to the user's natural language user inputs. If a user does not enable a skill, the system 1422 may not invoke the skill to execute with respect to the user's natural language user inputs.

The profile storage 1470 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 1470 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The profile storage 1470 may include data corresponding to state data 1495. For example, the profile storage 1470 may indicate the device process control capabilities of one or more devices 1410 associated with a particular user profile. Such state data 1495 may be updated by one or more device(s) 1410 as user(s) interact with the device(s) 1410 to maintain an updated record of the state of the device. Alternatively (or in addition) the profile storage 1470 may include, for a particular user profile, state data 1495 reflecting capability data indicating the device process control operations that may be performed by a device 1410.

The orchestrator component 1430 may send the sound data 262 to a language processing component 1492. The language processing component 1492 (sometimes also referred to as a spoken language understanding (SLU) component) includes an automatic speech recognition (ASR) component 1450 and a natural language understanding (NLU) component 1460. The ASR component 1450 may transcribe the sound data 262 into text data. The text data output by the ASR component 1450 represents one, or more than one (e.g., in the form of an N-best list), ASR hypotheses representing speech represented in the sound data 262. The ASR component 1450 interprets the speech in the sound data 262 based on a similarity between the sound data 262 and pre-established language models. For example, the ASR component 1450 may compare the sound data 262 with models for sounds (e.g., acoustic units such as phonemes, phones, etc.) and sequences of sounds to identify words that match the sequence of sounds of the speech represented in the sound data 262. The ASR component 1450 sends the text data generated thereby to an NLU component 1460, via, in some embodiments, the orchestrator component 1430. The text data sent from the ASR component 1450 to the NLU component 1460 may include a single top-scoring ASR hypothesis or may include an N-best list including multiple top-scoring ASR hypotheses. An N-best list may additionally include a respective score associated with each ASR hypothesis represented therein.

The language processing component 1492 may further include an NLU component 1460. The NLU component 1460 may receive the text data from the ASR component 1450. The NLU component 1460 may attempt to make a semantic interpretation of the phrase(s) or statement(s) represented in the text data input therein by determining one or more meanings associated with the phrase(s) or statement(s) represented in the text data. The NLU component 1460 may determine an intent representing an action that a user desires to be performed and may determine information that allows a device (e.g., the device 100, the system(s) 1422, a skill component 1490, skill processing component(s) 1425, etc.) to execute the intent. For example, if the text data corresponds to "play the 5th Symphony by Beethoven," the NLU component 1460 may determine an intent that the system output music and may identify "Beethoven" as an artist/composer and "5th Symphony" as the piece of music to be played. For further example, if the text data corresponds to "what is the weather," the NLU component 1460 may determine an intent that the system output weather information associated with a geographic location of the device 100. In another example, if the text data corresponds to "turn off the lights," the NLU component 1460 may determine an intent that the system turn off lights associated with the device 100 or the user.

A skill component 1490 may be software running on the system(s) 1422 that is akin to a software application. That is, a skill component 1490 may enable the system(s) 1422 to execute specific functionality in order to provide data or produce some other requested output. As used herein, a "skill component" may refer to software that may be placed on a machine or a virtual machine (e.g., software that may be launched in a virtual instance when called). A skill component 1490 may be software customized to perform one or more actions as indicated by a business entity, device manufacturer, user, etc. What is described herein as a skill component 1490 may be referred to using many different terms, such as an action, bot, app, or the like. The system(s) 1422 may be configured with more than one skill component 1490. For example, a weather service skill component may enable the system(s) 1422 to provide weather information, a car service skill component may enable the system(s) 1422 to book a trip with respect to a taxi or ride sharing service, a restaurant skill component may enable the system(s) 1422 to order a pizza with respect to the restaurant's online ordering system, etc. A skill component 1490 may operate in conjunction between the system(s) 1422 and other devices, such as the device 100, in order to complete certain functions. Inputs to a skill component 1490 may come from speech processing interactions or through other interactions or input sources. A skill component 1490 may include hardware, software, firmware, or the like that may be dedicated to a particular skill component 1490 or shared among different skill components 1490.

Skill processing component(s) 1425 may communicate with a skill component(s) 1490 within the system(s) 1422 and/or directly with the orchestrator component 1430 or with other components. A skill processing component(s) 1425 may be configured to perform one or more actions. An ability to perform such action(s) may sometimes be referred to as a "skill." That is, a skill may enable a skill processing component(s) 1425 to execute specific functionality in order to provide data or perform some other action requested by a user. For example, a weather service skill may enable a skill processing component(s) 1425 to provide weather information to the system(s) 1422, a car service skill may enable a skill processing component(s) 1425 to book a trip with respect to a taxi or ride sharing service, an order pizza skill may enable a skill processing component(s) 1425 to order a pizza with respect to a restaurant's online ordering system, etc. Additional types of skills include home automation skills (e.g., skills that enable a user to control home devices such as lights, door locks, cameras, thermostats, etc.), entertainment device skills 1491 (e.g., skills that enable a user to control entertainment devices such as smart televisions), video skills, flash briefing skills, as well as custom skills that are not associated with any pre-configured type of skill.

The system(s) 1422 may be configured with a skill component 1490 dedicated to interacting with the skill processing component(s) 1425. Unless expressly stated otherwise, reference to a skill, skill device, or skill component may include a skill component 1490 operated by the system(s) 1422 and/or skill operated by the skill processing component(s) 1490. Moreover, the functionality described herein as a skill or skill may be referred to using many different terms, such as an action, bot, app, or the like. The skill component 1490 and or skill processing component(s) 1425 may return output data to the orchestrator component 1430.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems may recognize, retain, and use information collected during more than one input during a back-and-forth or "multi-turn" interaction with the user; for example, information regarding a language in which a dialog is being conducted.

Although the components of FIG. 10 may be illustrated as part of system(s) 1422, a device 100, or otherwise, the components may be arranged in other device(s) (such as in the device 100 if illustrated in system(s) 1422 or vice-versa, or in other device(s) altogether) without departing from the disclosure.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A device comprising:
a body portion comprising:
a brushless direct current (DC) motor mechanically coupled to rotate a first gear;
a moveable portion comprising:
a rack comprising a plurality of teeth, wherein at least a portion of the plurality of teeth are mechanically engaged with the first gear;
a camera; and
a microphone array;
wherein the moveable portion is moveable, relative to the body portion, between an extended position and a retracted position;
a position encoder associated with the moveable portion; and
a control module comprising electronics to:
determine first state data indicative of:
a first state of operation of the camera, and
a first state of operation of the microphone array;
determine first encoder data using the position encoder, wherein the first encoder data is indicative of a first position of the moveable portion relative to the body portion;
operate the motor, based on the first encoder data, to maintain the moveable portion at a first setpoint position;
determine applied force data indicative of a first force applied to the moveable portion;
based on the first state data and the applied force data, determine a first action indicative of:
a second setpoint position,
a second state of operation of the camera, and
a second state of operation of the microphone array;
operate the motor, based on the first action, to maintain the moveable portion at the second setpoint position;
operate the camera in the second state of operation of the camera; and
operate the microphone array in the second state of operation of the microphone array.

2. The device of claim 1, further comprising:
a manual latch that is moveable between an unlatched position and a latched position, wherein:
in the latched position the manual latch prevents movement of the moveable portion from the retracted position to the extended position; and
in the unlatched position the manual latch permits movement of the moveable portion between the retracted position and the extended position.

3. The device of claim 1, further comprising:
an acoustic seal between the moveable portion and the body portion, wherein in the retracted position the acoustic seal is in contact with the moveable portion and the body portion.

4. A device comprising:
a body portion comprising:
a motor mechanically coupled to rotate a first gear;
a moveable portion comprising:
a rack comprising a plurality of teeth, wherein at least a portion of the plurality of teeth are mechanically engaged with the first gear; and
a first sensor;
wherein the moveable portion is moveable, relative to the body portion, between an extended position and a retracted position;
a manual latch that is moveable between a first latch position and a second latch position, wherein:
in the first latch position, the manual latch permits movement of the moveable portion between the retracted position and the extended position, and
in the second latch position, the manual latch prevents movement of the moveable portion from the retracted position to the extended position; and
a control module comprising electronics to:
determine first state data indicative of a first state of operation of the first sensor;
determine applied force data indicative of one or more characteristics of a first force applied to the moveable portion;
based on the applied force data and the first state data, determine a first action indicative of:
a first setpoint position, and
a second state of operation of the first sensor;
operate the motor, based on the first action, to maintain the moveable portion at the first setpoint position; and
operate the first sensor in the second state of operation.

5. The device of claim 4, wherein the motor comprises a brushless DC motor having at least six poles.

6. The device of claim 4, wherein the one or more characteristics comprise one or more of:
a magnitude of the first force,
a duration of the first force,
a start time of the first force, or
an end time of the first force.

7. The device of claim 4, the electronics further to:
determine electrical current drawn by the motor during operation; and
determine, based on the electrical current, the applied force data.

8. The device of claim 4, further comprising a position encoder; and
the electronics further to:
determine first encoder data at a first time using the position encoder, wherein the first encoder data is indicative of a first position of the moveable portion relative to the body portion;
determine second encoder data at a second time using the position encoder, wherein the second encoder data is indicative of a second position of the moveable portion relative to the body portion; and
determine, based on the first encoder data and the second encoder data, the applied force data.

9. The device of claim 4, further comprising:
an acoustic seal between the moveable portion and the body portion, wherein in the retracted position the acoustic seal is in contact with the moveable portion and the body portion.

10. The device of claim 4, wherein the motor comprises a position encoder, and
the electronics further to:
determine first encoder data using the position encoder, wherein the first encoder data is indicative of a first position of the moveable portion relative to the body portion; and
operate the motor based at least in part on the first encoder data.

11. The device of claim 4, the first sensor comprising:
a pan and tilt mechanism affixed to the moveable portion; and
a camera affixed to the pan and tilt mechanism.

12. The device of claim 4, wherein the first sensor comprises a camera; and
the moveable portion further comprising:
a microphone array, wherein the microphone array is distal to the camera; and
wherein in the first setpoint position:
the microphone array is uncovered by the body portion,
the camera is covered by the body portion, and
the second state of operation disables the camera.

13. The device of claim 4, wherein:
the first sensor comprises a camera;
the moveable portion further comprises a microphone array;
the first action is further indicative of a first state of operation of the microphone array; and
the control module further comprising the electronics to:
operate the microphone array in the first state of operation of the microphone array.

14. A device comprising:
a body portion comprising:
a motor mechanically coupled to a mechanical linkage;
a moveable portion coupled to the mechanical linkage, the moveable portion comprising:
a camera; and
a microphone array;
wherein the mechanical linkage moves the moveable portion, relative to the body portion, between an extended position and a retracted position; and
a control module comprising electronics to:
determine first state data indicative of at least a first state of operation of the camera;
determine applied force data associated with a first force applied to the moveable portion;
based on the first state data and the applied force data, determine a first action indicative of:
a first setpoint position, and
a second state of operation of the camera;
operate the motor to maintain the moveable portion at the first setpoint position,
wherein in the first setpoint position:
the microphone array is uncovered by the body portion, and
the camera is covered by the body portion; and
operate the camera in the second state of operation, wherein the second state of operation disables the camera.

15. The device of claim 14, wherein the motor comprises a brushless DC motor having at least six poles and the mechanical linkage comprising:
a first gear coupled to the motor, and
a rack comprising a plurality of teeth, wherein at least a portion of the plurality of teeth are mechanically engaged with the first gear.

16. The device of claim 14, wherein the mechanical linkage comprises a cam affixed to the motor and a pushrod having a distal end mechanically connected to the moveable portion and a proximate end that is in contact with the cam.

17. The device of claim 14, further comprising a position encoder; and
the electronics further to:
determine first encoder data at a first time using the position encoder, wherein the first encoder data is indicative of a first position of the moveable portion relative to the body portion; and
operate the motor based at least in part on the first encoder data.

18. The device of claim 14, further comprising:
a manual latch member that is moveable between a first latch position and a second latch position, wherein:
in the second latch position the manual latch member prevents movement of the moveable portion from the retracted position to the extended position; and
in the first latch position the manual latch member permits movement of the moveable portion between the retracted position and the extended position.

19. The device of claim 14, further comprising:
an acoustic seal between the moveable portion and the body portion, wherein in the retracted position the acoustic seal is in contact with the moveable portion and the body portion.

20. The device of claim 14, further comprising a position encoder; and
the electronics further to:
determine first encoder data at a first time using the position encoder, wherein the first encoder data is indicative of a first position of the moveable portion relative to the body portion;

determine second encoder data at a second time using the position encoder, wherein the second encoder data is indicative of a second position of the moveable portion relative to the body portion; and
determine, based on the first encoder data and the second encoder data, the applied force data.

\* \* \* \* \*